(12) United States Patent
Tomigashi et al.

(10) Patent No.: US 9,359,915 B2
(45) Date of Patent: Jun. 7, 2016

(54) POWER GENERATION CONTROL SYSTEM, POWER GENERATION APPARATUS, AND CONTROL METHOD FOR RANKINE CYCLE SYSTEM

(71) Applicant: Panasonic Corporation, Osaka (JP)

(72) Inventors: Yoshio Tomigashi, Osaka (JP); Atsuo Okaichi, Osaka (JP); Tetsuya Matsuyama, Nara (JP); Noriyoshi Nishiyama, Osaka (JP); Osamu Kosuda, Osaka (JP); Takumi Hikichi, Osaka (JP); Osao Kido, Kyoto (JP); Masaaki Konoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/483,141

(22) Filed: Sep. 10, 2014

(65) Prior Publication Data

US 2015/0084346 A1    Mar. 26, 2015

(30) Foreign Application Priority Data

Sep. 20, 2013  (JP) ................................ 2013-195299
Jun. 10, 2014  (JP) ................................ 2014-119304

(51) Int. Cl.
*H02P 9/08*     (2006.01)
*F01K 13/02*    (2006.01)
*H02P 9/00*     (2006.01)

(52) U.S. Cl.
CPC ................ *F01K 13/02* (2013.01); *H02P 9/008* (2013.01)

(58) Field of Classification Search
CPC ..................................................... F01K 13/02
USPC ............................................................. 290/2
See application file for complete search history.

(56) References Cited

U.S. PATENT DOCUMENTS 3,774,397 A * 11/1973  Engdahl .................. F01K 13/00
                                                                 137/59
4,010,378 A *  3/1977  Tharpe ............... B60H 1/00007
                                                                 290/2

(Continued)

FOREIGN PATENT DOCUMENTS

CH  102004016450 A1 * 10/2005 ................ H02P 9/08
DE     101 16 387         10/2002

(Continued)

OTHER PUBLICATIONS

Computer Translation of DE102004016450.*

(Continued)

*Primary Examiner* — Joseph Waks
(74) *Attorney, Agent, or Firm* — Wenderoth, Lind & Ponack, L.L.P.

(57) ABSTRACT

A power generation control system includes a converter and a controller. The converter controls a generator of a Rankine cycle system, the Rankine cycle system including an expander, the generator, which is interconnected to the expander, a pump which feeds a working fluid, and an evaporator which evaporates a working fluid. The controller causes the converter to execute, in at least one of a startup operation and a shutdown operation of the Rankine cycle system, first control in at least one of a startup operation and a shutdown operation of the Rankine cycle system such that the expander is prevented from expanding a working fluid if the working fluid at an outlet of the evaporator contains a liquid component while the pump is operating.

16 Claims, 12 Drawing Sheets

(56) References Cited

U.S. PATENT DOCUMENTS

| | | | |
|---|---|---|---|
| 2006/0242961 A1* | 11/2006 | Sato | F01K 13/02 60/645 |
| 2006/0254276 A1* | 11/2006 | Sato | F01K 23/101 60/645 |
| 2009/0071156 A1 | 3/2009 | Nishikawa et al. | |
| 2011/0000182 A1* | 1/2011 | Lasker | F02C 1/04 60/39.24 |
| 2011/0179793 A1 | 7/2011 | Stegmaier et al. | |
| 2015/0096297 A1* | 4/2015 | Haraguchi | F01K 13/02 60/615 |
| 2015/0247427 A1* | 9/2015 | Takahashi | F01K 13/02 60/663 |
| 2015/0285101 A1* | 10/2015 | Hikichi | F01K 13/02 60/670 |

FOREIGN PATENT DOCUMENTS

| | | |
|---|---|---|
| EP | 2 354 515 | 8/2011 |
| JP | 2007-327697 | 12/2007 |
| JP | 2009-097387 | 5/2009 |
| WO | 2009/017474 | 2/2009 |
| WO | 2010/083198 | 7/2010 |

OTHER PUBLICATIONS

The Extended European Search Report dated Jan. 29, 2015 for the related European Patent Application No. 14182633.9.

* cited by examiner

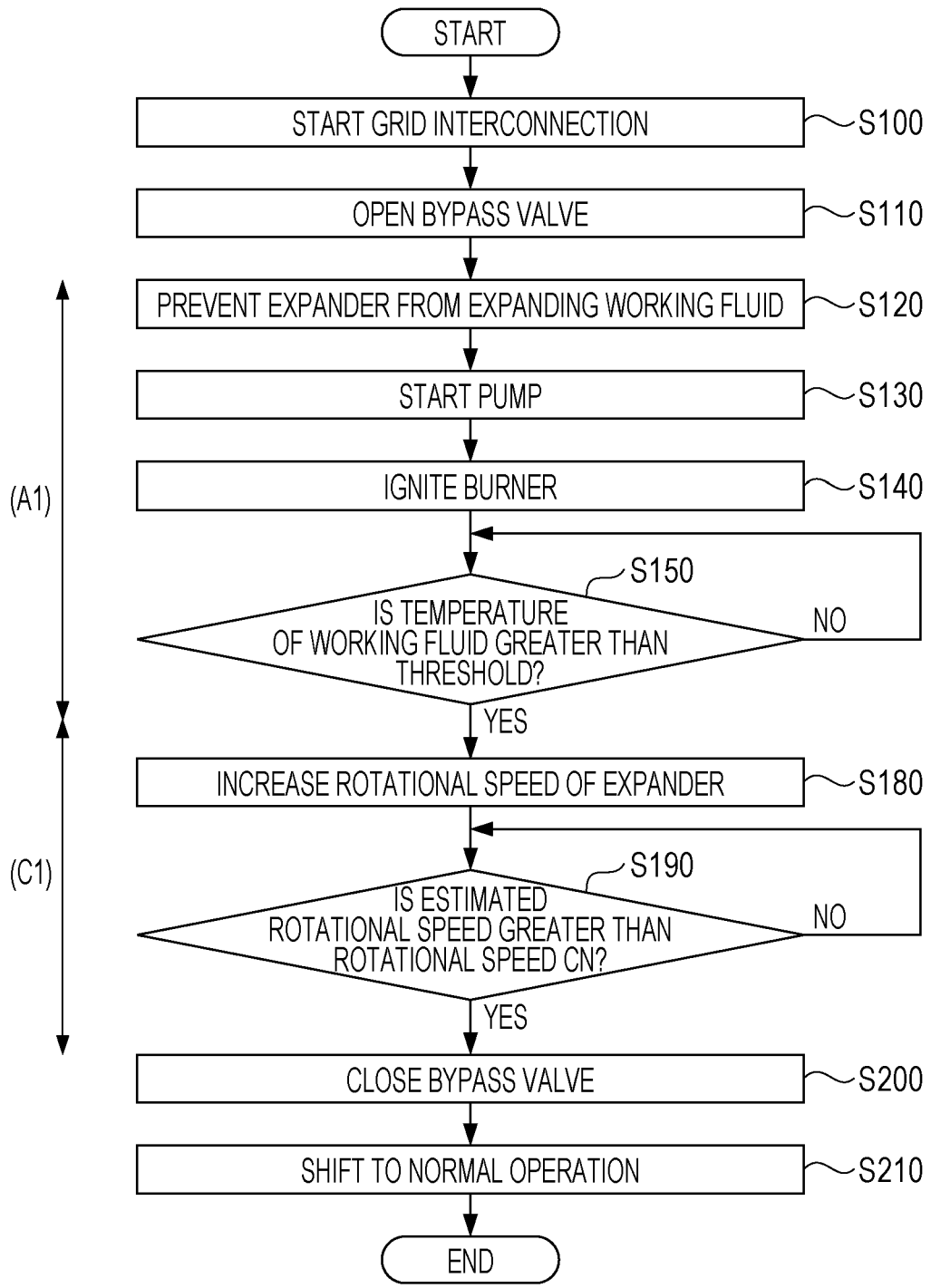

POWER GENERATION CONTROL SYSTEM, POWER GENERATION APPARATUS, AND CONTROL METHOD FOR RANKINE CYCLE SYSTEM

TECHNICAL FIELD

The present disclosure relates to a power generation control system, a power generation apparatus, and a control method for a Rankine cycle system.

DESCRIPTION OF THE RELATED ART

Japanese Unexamined Patent Application Publication Nos. 2009-97387 and 2007-327697 disclose that a Rankine cycle system is used as an exhaust-gas utilizing apparatus. In a fluid circuit of the Rankine cycle system, a pump, an evaporator (heat exchanger for heating), an expander (turbine), and a condenser (heat exchanger for heat dissipation) are linked in a ring-like form. A generator is interconnected to the expander. The pump circulates a working fluid. The evaporator heats the working fluid. With this operation, the working fluid is transformed into a superheated vapor. The working fluid in the state of a superheated vapor flows into the expander. The working fluid then expands adiabatically in the expander. Then, a driving force is generated, in the expander so as to operate the expander. Due to the operation of the expander, the generator is operated and generates power. That is, the expander and the generator convert thermal energy into electrical energy. The condenser cools an expanded working fluid by using, for example, cooling air, thereby condensing the working fluid. The condensed working fluid is sucked into the pump.

In a typical fluid circuit, a bypass channel is provided between an evaporator and a condenser. The bypass channel is a channel which bypasses an expander. In the bypass channel, an opening-and-closing device (bypass valve) is disposed. In the fluid circuit, a temperature sensor (temperature detector) for detecting the temperature of a working fluid at the inlet of the expander may be provided.

SUMMARY

High reliability is demanded for a recent Rankine cycle system. In view of this background, one non-limiting and exemplary embodiment provides a Rankine cycle system exhibiting higher reliability than that of the related art.

Additional benefits and advantages of the disclosed embodiments will be apparent from the specification and figures. The benefits and/or advantages may be individually provided by the various embodiments and features of the specification and drawings disclosed, and need not all be provided in order to obtain one or more of the same.

According to an embodiment of the present disclosure, there is provided a power generation control system including a converter and a controller. The converter controls a generator of a Rankine cycle system, the Rankine cycle system including an expander, the generator, which is interconnected to the expander, a pump which feeds a working fluid, and an evaporator which evaporates a working fluid. The controller causes the converter to execute first control in at least one of a startup operation and a shutdown operation of the Rankine cycle system such that the expander is prevented from expanding a working fluid if the working fluid at an outlet of the evaporator contains a liquid component while the pump is operating.

In the above-described power generation control system, it is possible to increase the reliability of a Rankine cycle system.

BRIEF DESCRIPTION OF THE DRAWINGS

FIG. 12 is a flowchart of a startup operation in the second embodiment.

DETAILED DESCRIPTION OF THE EMBODIMENTS

Figure 1:
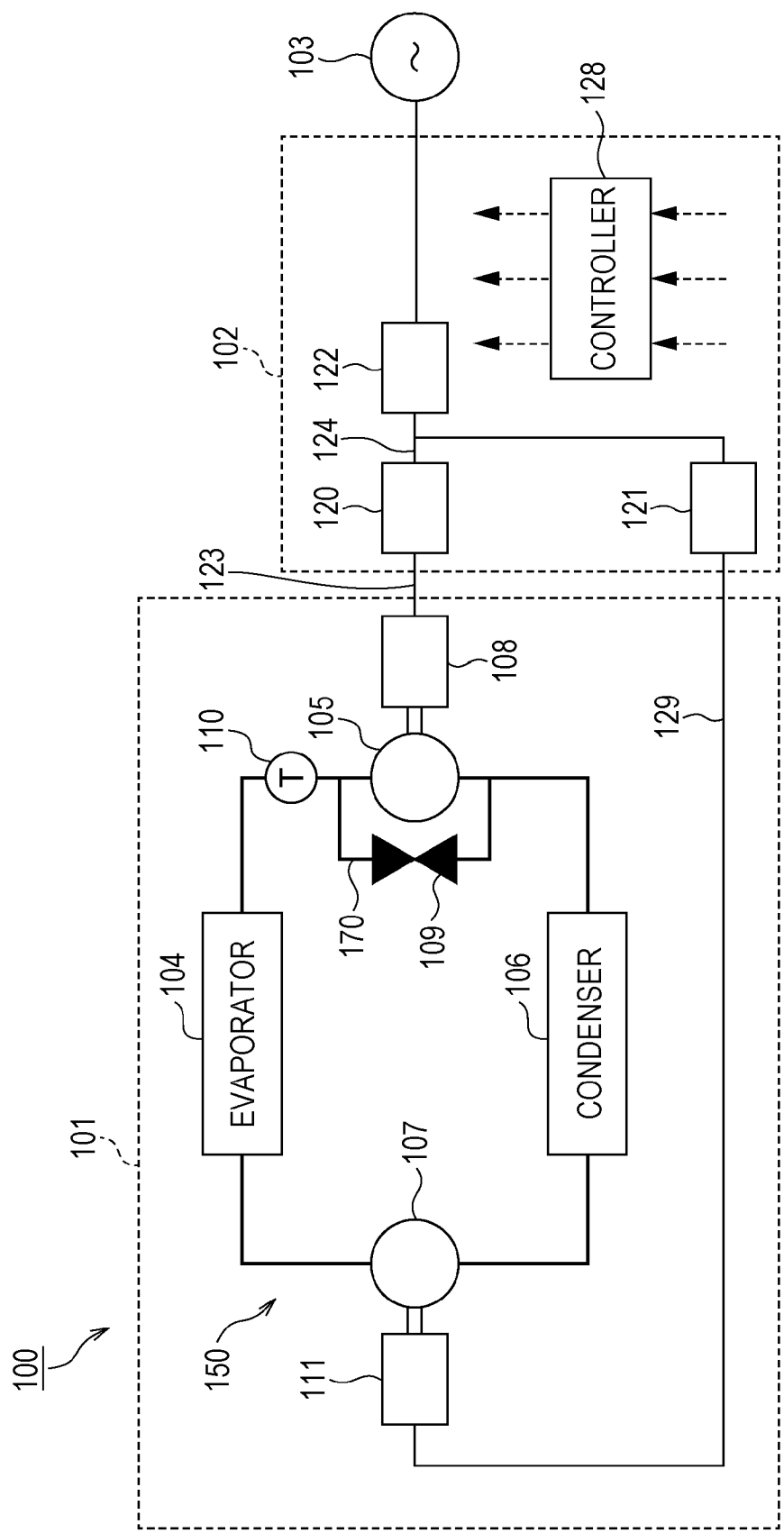
FIG. 1 is a block diagram of a power generation apparatus according to a first embodiment.

Japanese Unexamined Patent Application Publication Nos. 2009-97387 and 2007-327697 disclose a configuration in which a generator is operated as an electric motor in order to reliably start the generator in a startup operation of a Rankine cycle system. With this configuration, however, an expander sucks a working fluid containing a liquid component. A working fluid containing a liquid, component (liquid working fluid) causes lubrication oil to be discharged from the expander, thereby causing a shortage of lubrication oil in the expander. This increases the possibility of wear of the expander or increases loss in the expander. If an expander which does not use lubrication oil (for example, a turbo-type expander) is utilized in a Rankine cycle system, a liquid, working fluid causes erosion (physical erosion) of the expander.

The inventors of this disclosure have made a study of improving the reliability of a Rankine cycle system by reducing frequency with which a liquid working fluid, is sucked into an expander.

According to a first aspect of the disclosure, there is provided a power generation control system including a converter and a controller. The converter controls a generator of a Rankine cycle system, the Rankine cycle system including an expander, the generator, which is interconnected to the expander, a pump which feeds a working fluid, and an evaporator which evaporates a working fluid. The controller causes the converter to execute first control in at least, one of a startup operation and a shutdown operation of the Rankine cycle system such, that the expander is prevented from expanding a working fluid if the working fluid at an outlet of the evaporator contains a liquid component while the pump is operating.

In the power generation control system according to the first aspect, in at least one of the startup operation and the shutdown operation, it is possible to reduce the possibility that a liquid working fluid, be sucked into the expander, compared, with the related art.

In this case, "if the working fluid at an outlet of the evaporator contains a liquid component while the pump is operating" means that the period in which the first control is executed includes at least part of a period for which a working fluid at the outlet of the evaporator contains a liquid component while the pump is operating.

According to a second, aspect of the disclosure, in the power generation control system according to the first aspect, the controller may cause the converter to restrict an operation of a rotor of the generator by causing a DC through the generator, thereby preventing the expander from expanding a working fluid.

According to a third aspect of the disclosure, in the power generation control system, according to the first aspect, the expander may also serve as a compressor, and the controller may cause the converter to control the generator such that the expander compresses a working fluid, thereby preventing the expander from expanding a working fluid.

In the power generation control system according to the second or third aspect, it is possible to more easily reduce the possibility that a liquid working fluid be sucked into the expander, compared with the related art.

According to a fourth aspect of the disclosure, in the power generation control system according to the first aspect, in the startup operation of the Rankine cycle system, subsequent to the first control, the controller may cause the converter to execute second control to allow the expander to expand the working fluid by setting a voltage across terminals of the generator to be zero or by setting a current flowing through the generator to be zero.

In the power generation control system according to the fourth aspect, braking torque generated in the generator can be reduced by setting a voltage across terminals of the generator to be zero. Additionally, braking torque generated in the generator can be reduced to zero by setting a current flowing through the generator to be zero. Accordingly, it is possible to smoothly increase the rotational speed of the generator.

According to a fifth aspect of the disclosure, in the power generation control system according to the fourth aspect, in the startup operation of the Rankine cycle system, subsequent to the second control, the controller may cause the converter to execute third control in which the controller controls the generator such that a rotational speed of the generator is adjusted.

In this case, "a rotational speed of the generator is adjusted" means that the rotational speed itself of the generator may be adjusted, or a parameter related to the rotational speed of the generator may be adjusted. Examples of a parameter related to the rotational speed of the generator are power generated by the generator and a braking force generate in the generator.

According to the fifth aspect, since the rotational speed of the generator is increased, in the second control, it is possible to perform control, in a state in which it is easier to estimate the position of the rotor of the generator, by using the converter such that the rotational speed of the generator is increased, compared with a case in which the third control is executed subsequent to the first control.

In the second control, the rotational speed of the expander may be estimated on the basis of the value of a voltage across terminals of the generator and the value of a current flowing through the generator. Then, the timing at which the operation is shifted from the second control to the third control may be determined on the basis of the estimated rotational speed of the expander or the generator. With this operation, it is possible to start to adjust, the rotational speed of the generator at an appropriate timing.

In this case, "the rotational speed of the expander" may be the rotational speed itself of the expander, or may be a parameter related to the rotational speed of the expander. Examples of a parameter related to the rotational speed of the expander are the rotational speed of the generator and a time elapsed after the second period is started.

According to a sixth aspect of the disclosure, in the power generation control system according to the third aspect, in the startup operation of the Rankine cycle system, the controller may cause the converter to execute, subsequent to the first control, third control in which the controller controls the generator such that a rotational speed of the generator is adjusted, and the converter (i) may estimate a position of a rotor of the generator by causing a current containing a high-frequency component to flow through the generator while the first control is being executed, and (ii) may start to adjust the rotational speed of the generator by using an estimated position of the rotor in a transition from the first control to the third control.

In this case, "a rotational speed of the generator is adjusted" means that the rotational speed itself of the generator may be adjusted, or a parameter related to the rotational speed of the generator may be adjusted. Examples of a parameter related to the rotational speed of the generator are power generated by the generator and a braking force generate in the generator.

According to a seventh aspect of the disclosure, in the power generation control system according to the second aspect, in the startup operation of the Rankine cycle system, the controller may cause the converter to execute, subsequent to the first control, third control in which the controller controls the generator such that a rotational speed of the generator is adjusted, and the converter (i) may restrict the operation of the rotor and may also estimate a position of the rotor by causing a current generated by superposing a high-frequency component on a DC component to flow through the generator while the first control is being executed, and (ii) may start to adjust the rotational speed of the generator by using an estimated position of the rotor in a transition from the first control to the third control.

In the power generation control system according to the sixth or seventh aspect, it is possible to smoothly start to adjust the rotational speed of the generator, power generated by the generator, or the braking force generated in the generator.

In this case, "a rotational speed of the generator is adjusted" means that the rotational speed itself of the generator may be adjusted, or a parameter related to the rotational speed of the generator may be adjusted. Examples of a parameter related to the rotational speed of the generator are power generated by the generator and a braking force generate in the generator.

According to an eighth aspect of the disclosure, in the power generation control system according to the first aspect, the controller may execute the first control when a temperature of the working fluid that has passed through the evaporator is equal to or smaller than a threshold.

In the power generation control system according to the eighth aspect, it is possible to reduce the possibility that a liquid, working fluid be sucked into the expander in the startup operation, compared, with the related art.

In this case, "a temperature of the working fluid" may be the temperature itself of a working fluid, or may be a parameter related to the temperature of a working fluid. Examples of a parameter related, to the temperature of a working fluid are the pressure of a working fluid or a time elapsed after the first control is started. The temperature of a working fluid and a parameter related to the temperature of a working fluid may be a measured value or an estimated value.

The threshold is set to be a value smaller than the temperature of a working fluid that does not contain a liquid component when it has passed through the evaporator.

According to a ninth aspect of the disclosure, in the power generation control system according to the first aspect, the Rankine cycle system may include a bypass channel which bypasses the expander and an opening-and-closing device which opens and closes the bypass channel. In at least one of the startup operation and the shutdown operation of the Rankine cycle system, the controller may control the opening-and-closing device to be opened, while the first control is being executed.

In the power generation control system according to the ninth aspect, in at least one of the startup operation and the shutdown operation, it is possible to reduce the possibility that a liquid working fluid be sucked into the expander, compared, with the related art.

According to a tenth aspect of the disclosure, in the power generation control system according to the first aspect, in the shutdown operation of the Rankine cycle system, the controller may terminate the first control after the pump stops operating. In the power generation control system according to the tenth aspect, in the shutdown operation, it is possible to reduce the possibility that a liquid working fluid, be sucked into the expander, compared with the related art.

According to an eleventh aspect of the disclosure, in the power generation control system, according to the ninth aspect, in the startup operation of the Rankine cycle system, subsequent to the first control, the controller may cause the converter to execute second, control to allow the expander to expand a working fluid by setting a voltage across terminals of the generator to be zero or by setting a current flowing through the generator to be zero, and the controller may control the opening-and-closing device such that an opening degree of the opening-and-closing device at an end point of the second control is smaller than an opening degree of the opening-and-closing device at a start point of the second control.

According to a twelfth aspect of the disclosure, in the power generation control system according to the ninth aspect, in the startup operation of the Rankine cycle system, subsequent to the first control, the controller may cause the converter to execute third control in which the controller controls the generator such that a rotational speed of the generator is adjusted, and the controller may control the opening-and-closing device such that an opening degree of the opening-and-closing device at an end point of the startup operation is smaller than an opening degree of the opening-and-closing device at a start, point of the third control.

According to a thirteenth aspect of the disclosure, in the power generation control system, according to the eleventh, aspect, in the startup operation of the Rankine cycle system, subsequent to the second control, the controller may cause the converter to execute third control in which the controller controls the generator such that a rotational speed of the generator is adjusted, and the controller may control the opening-and-closing device such that an opening degree of the opening-and-closing device at an end point of the startup operation is smaller than an opening degree of the opening-and-closing device at a start point of the third control.

In the power generation control system according to the eleventh, twelfth, or thirteenth aspect, the flow rate of a working fluid flowing through the expander is increased at an appropriate timing.

In this case, "a rotational speed of the generator is adjusted" means that the rotational speed itself of the generator may be adjusted, or a parameter related to the rotational speed of the generator may be adjusted. Examples of a parameter related to the rotational speed of the generator are power generated by the generator and a braking force generate in the generator.

According to a fourteenth aspect of the disclosure, the power generation control system according to the first aspect may further include a grid-interconnection power converter to be connected to an electrical grid. Power may be supplied to the converter from the electrical grid via the grid-interconnection power converter so as to prevent the expander from expanding the working fluid.

The power generation control system according to the fourteenth aspect may be used for various purposes.

According to a fifteenth aspect of the disclosure, there is provided a power generation apparatus including the power generation control system according to the first aspect and the Rankine cycle system controlled by the power generation control system.

According to a sixteenth aspect of the disclosure, there is provided a control method for a Rankine cycle system including an expander, a generator interconnected to the expander, a pump feeding a working fluid, and an evaporator evaporating the working fluid, the control method including: a step of controlling power to be generated by the generator; and a step of controlling, in at least one of a startup operation and a shutdown operation of the Rankine cycle system, the generator such that the expander is prevented from expanding a working fluid if the working fluid at an outlet of the evaporator contains a liquid component while the pump is operating.

In the control method according to the sixteenth aspect, advantages similar to those obtained by the power generation control system according to the first aspect may be achieved.

The techniques concerning the power generation control system may be applicable to the power generation apparatus. The techniques concerning the power generation control system may be applicable to the control method for the Rankine cycle system.

Embodiments of the disclosure will be described below with reference to the accompanying drawings.

(First Embodiment)

A power generation apparatus 100 includes, as shown in FIG. 1, a Rankine cycle system 101 and a power generation control system 102. The power generation apparatus 100 may be connected to an electrical grid 103 of an external source. The electrical grid 103 is capable of supplying power to the Rankine cycle system 101. The electrical grid 103 may also receive power supplied from the Rankine cycle system 101. The electrical grid 103 is, for example, a mains AC electric power supply.

The Rankine cycle system 101 includes a fluid circuit 150, a generator 108, and an electric motor 111. The fluid circuit 150 is a circuit through which a working fluid flows. The fluid circuit 150 forms a Rankine cycle.

The fluid circuit 150 includes a pump 107, an evaporator 104, an expander 105, and a condenser 106. These components are connected to each other in a ring-like form, by a plurality of pipes in this order. A temperature sensor 110 is provided, between the outlet of the evaporator 104 and the inlet of the expander 105 of the fluid circuit 150. The fluid circuit 150 also includes a bypass channel 170 which bypasses the expander 105. An upstream end of the bypass channel 170 is connected to a node between the outlet of the evaporator 104 and the inlet of the expander 105 in the fluid circuit 150. A downstream end of the bypass channel 170 is connected to a node between the outlet of the expander 105 and the inlet of the condenser 106 in the fluid circuit 150. The bypass channel 170 includes a bypass valve (opening-and-closing device) 109.

On the basis of the temperature of a working fluid that has passed through the evaporator 104 and measured by the temperature sensor 110, it is determined whether or not the working fluid at the outlet of the evaporator 104 contains a liquid component. In this embodiment, the temperature sensor 110 is disposed between the outlet of the evaporator 104 and the inlet of the expander 105 in the fluid circuit 150. However, the temperature sensor 110 may be disposed at any position as long as it is capable of measuring the temperature of a working fluid that has passed through the evaporator 104. The temperature of a working fluid that has passed through the evaporator 104 refers to the temperature of a working fluid flowing from the outlet of the evaporator 104 to the inlet of the condenser 106 in the fluid circuit 150. Accordingly, the temperature of a working fluid flowing through the bypass channel 170 may be measured by the temperature sensor 110 disposed in the bypass channel 170. Alternatively, the temperature of a working fluid flowing through the fluid circuit 150 may be measured by the temperature sensor 110 disposed between the downstream end of the bypass channel 170 and the condenser 106 in the fluid circuit 150. While a working fluid is flowing through the bypass channel 170, a determination may be made whether or not the working fluid at the outlet of the evaporator 104 contains a liquid component, on the basis of the temperature detected by the temperature sensor 110 disposed at one of the above-described positions. Alternatively, the temperature of a working fluid flowing through the fluid circuit 150 may be measured by the temperature sensor 110 disposed, between the outlet of the expander 105 and the inlet of the condenser 106 in the fluid circuit 150. On the basis of the temperature detected, by the temperature sensor 110 disposed at this position and an estimated decrease in the temperature of the working fluid in the expander 105, it may be determined whether or not the working fluid at the outlet of the evaporator 104 contains a liquid component.

The generator 108 is interconnected to the expander 105. The electric motor 111 is interconnected to the pump 107. The generator 108 is driven by the expander 105. The electric motor 111 drives the pump 107.

The pump 107 is an electrically operated pump. The pump 107 is capable of circulating a liquid working fluid. More specifically, as the pump 107, a positive displacement pump or a turbo pump, either of which is normally used, may be used. Examples of positive displacement, pumps are piston pumps, gear pumps, vane pumps, and rotary pumps. Examples of turbo pumps are centrifugal pumps, mixed-flow pumps, and axial-flow pumps. Since the pump 107 is not interconnected to the expander 105, it is able to operate independently of the expander 105.

The evaporator 104 is a heat exchanger that absorbs thermal energy of a combustion gas generated in a boiler (not shown). The evaporator 104 is, for example, a finned tube heat exchanger, and is disposed within a boiler. A combustion gas generated in the boiler and a working fluid in the Rankine cycle system 101 conduct heat exchange in the evaporator 104. Due to this heat exchange, the working fluid is heated and evaporated. Although in this embodiment a heat source is a boiler, another heat source may be utilized. For example, a heat source utilizing waste heat energy exhausted from a facility, such as a factory or an incinerator, may be employed.

The expander 105 expands a working fluid so as to convert expansion energy of the working fluid into a rotational force. The generator 108 is connected to a shaft of the expander 105. The generator 108 is driven by the expander 105. The expander 105 is, for example, a positive displacement or turbo expander. Examples of positive displacement expanders are scroll expanders, rotary expanders, screw expanders, and reciprocating expanders. The turbo expander is a so-called expansion turbine.

The condenser 106 causes a working fluid discharged from the expander 105 to conduct heat exchange with a heat medium, such as cooling water or cooling air, in a heat medium circuit (not shown), thereby cooling the working fluid. As the condenser 106, a known heat exchanger, such as a plate heat exchanger or a double pipe heat exchanger, may be used. The type of condenser 106 is suitably selected in accordance with the type of heat medium in the heat medium circuit. If the heat medium in the heat medium circuit is a liquid, such as water, a plate heat exchanger or a double pipe heat exchanger may be used as the condenser 106. If the heat medium in the heat medium circuit is a gas, such, as air, a finned tube heat, exchanger may be used as the condenser 106.

The bypass valve 109 is a value in which the opening degree is changeable. By changing the opening degree of the bypass valve 109, the flow rate of a working fluid, bypassing the expander 105 may be adjusted. As the bypass valve 109, an electromagnetic opening-and-closing valve may be used.

The generator 108 is, for example, a permanent-magnet synchronous generator. The electric motor 111 is a permanent-magnet synchronous motor.

As a working fluid used in the Rankine cycle system 101, an organic working fluid, for example, may be used. Examples of an organic working fluid are halogenated hydrocarbon, hydrocarbon, and alcohol. Examples of halogenated hydrocarbon are R-123, R-245fa, and R-1234ze. Examples of hydrocarbon are alkane, such as propane, butane, pentane, and isopentane. An example of alcohol is ethanol. As a working fluid, one of these compounds may be used singly, or a mixture of two or more compounds may be used. As a working fluid, an inorganic working fluid, such as water, carbon dioxide, and ammonia, may be used.

An overview of the operation of the Rankine cycle system 101 is as follows. The pump 107 supplies a working fluid with pressure and causes it to circulate. The evaporator 104 heats the working fluid by using heat output from a heat source (not shown), such as a boiler. Then, the working fluid is transformed into a superheated vapor (gas). The working fluid in the state of a superheated vapor flows into the expander 105. The working fluid then expands adiabatically in the expander 105. Then, a driving force is generated in the expander 105 so as to operate the expander 105. That is, the expander 105 converts expansion energy (thermal energy) into mechanical energy. In accordance with the operation of the expander 105, the generator 108 is operated and generates power. That is, the generator 108 converts mechanical energy into electrical energy. In short, the expander 105 and the generator 108 convert thermal energy into electrical energy. The condenser 106 cools an expanded working fluid discharged from the expander 105 by using cooling water or cooling air, thereby condensing the working fluid and transforming it into a liquid. The liquid working fluid is sucked into the pump 107. The temperature sensor 110 detects the temperature of the working fluid that has passed through the evaporator 104. On the basis of a detection signal indicating the detected temperature, a bypass valve control circuit (not shown) controls the opening degree of the bypass valve 109, thereby adjusting the flow rate of a working fluid flowing through the bypass channel 170.

The power generation control system 102 controls the Rankine cycle system 101. The power generation control system 102 includes a converter 120, a pump driving circuit (drive circuit) 121, a grid-interconnection power converter 122, and a controller 128. The converter 120 is connected, to the generator 108 via a three-phase cable 123. The pump driving circuit 121 is connected to the electric motor 111 via a three-phase cable 129. The grid-interconnection power converter 122 may be connected to the electrical grid 103. The converter 120 and the grid-interconnection power converter 122 are connected to each other via a DC cable 124.

The controller 128 performs the following first control. In at least one of a startup operation and a shutdown operation of the Rankine cycle system 101, if a working fluid at the outlet of the evaporator 104 contains a liquid, component while the pump 107 is operating, the controller 128 causes the converter 120 to control the generator 108 such that, the expander 105 is prevented from expanding a working fluid. The controller 128 may be of any type as long as it has a control function. The controller 128 includes a processor (not shown) and a storage unit (not shown) storing a control program therein. As the processor, a micro-processing unit (MRU) or a central processing unit (CPU) may be used. As the storage unit, a memory may be used. The controller 128 may be constituted by a single control unit that performs centralized control or by a plurality of control units that perform distributed control in cooperation with each other.

The grid-interconnection power converter 122 converts AC power obtained from the electrical grid 103 into DC power. The converted DC power is supplied to the pump driving circuit 121 and also to the converter 120. While the generator 108 is generating power, the converter 120 converts AC power generated in the generator 108 into DC power. The converted. DC power is supplied, to the pump driving circuit 121. If the converted DC power is greater than DC power that should, be supplied, to the pump driving circuit 121, part of the converted DC power (surplus power) is converted into AC power by the grid-interconnection power converter 122. The converted AC power is supplied, (reversely flows back) to the electrical grid 103. With this configuration, the converter 120 is able to apply braking torque or driving torque to the expander 105 via the generator 108. The pump driving circuit 121 is capable of driving the pump 107 via the electric motor 111 without requiring a separate power supply circuit.

Figure 2:
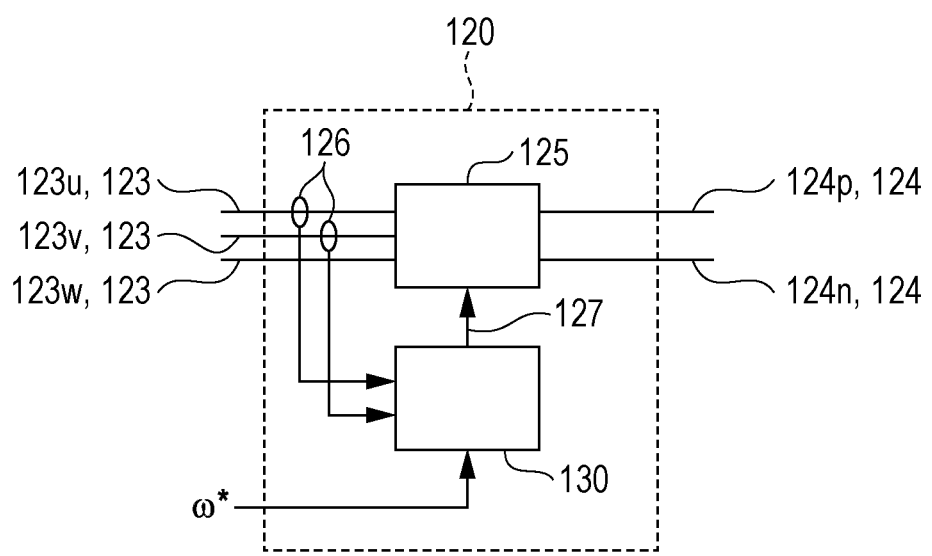
FIG. 2 is a block diagram of a converter in the first embodiment.

The converter 120 controls the generator 108, as shown in FIG. 2. The converter 120 includes a converter circuit 125, a converter control unit 130, and a current sensor 125. In this embodiment or modified examples, which will be discussed below, part of or the entirety of the control function of the converter control unit 130 may be integrated into the controller 128.

The converter circuit 125 is connected to the grid-interconnection power converter 122 via the DC cable 124. The DC cable 124 includes a positive wire 124p and a negative wire 124n. The converter circuit 125 is connected to the generator 108 via the three-phase cable 123. The three-phase cable 123 includes a U-phase winding 123u, a V-phase winding 123v, and a W-phase winding 123w. A U-phase current $i_u$ flows through the U-phase winding 123u. A V-phase current $i_v$ flows through the V-phase winding 123v. A W-phase current $i_w$ flows through the W-phase winding 123W. The converter circuit 125 is driven on the basis of a control signal 127 output from the converter control unit 130. Then, in the converter circuit 125, three-phase AC power is converted into DC power. In the converter circuit 125, DC power is also converted into three-phase AC power. In this embodiment, the control signal 127 is a so-called pulse width modulation (PWM) signal. The converter circuit 125 includes a switching element for performing PWM.

The converter control unit 130 outputs the control signal 127 on the basis of a target rotational speed $\omega^*$, a U-phase current $i_u$, and a V-phase current $i_v$. The U-phase current $i_u$ and the V-phase current $i_v$ are detected by the current sensor 126.

Figure 3:
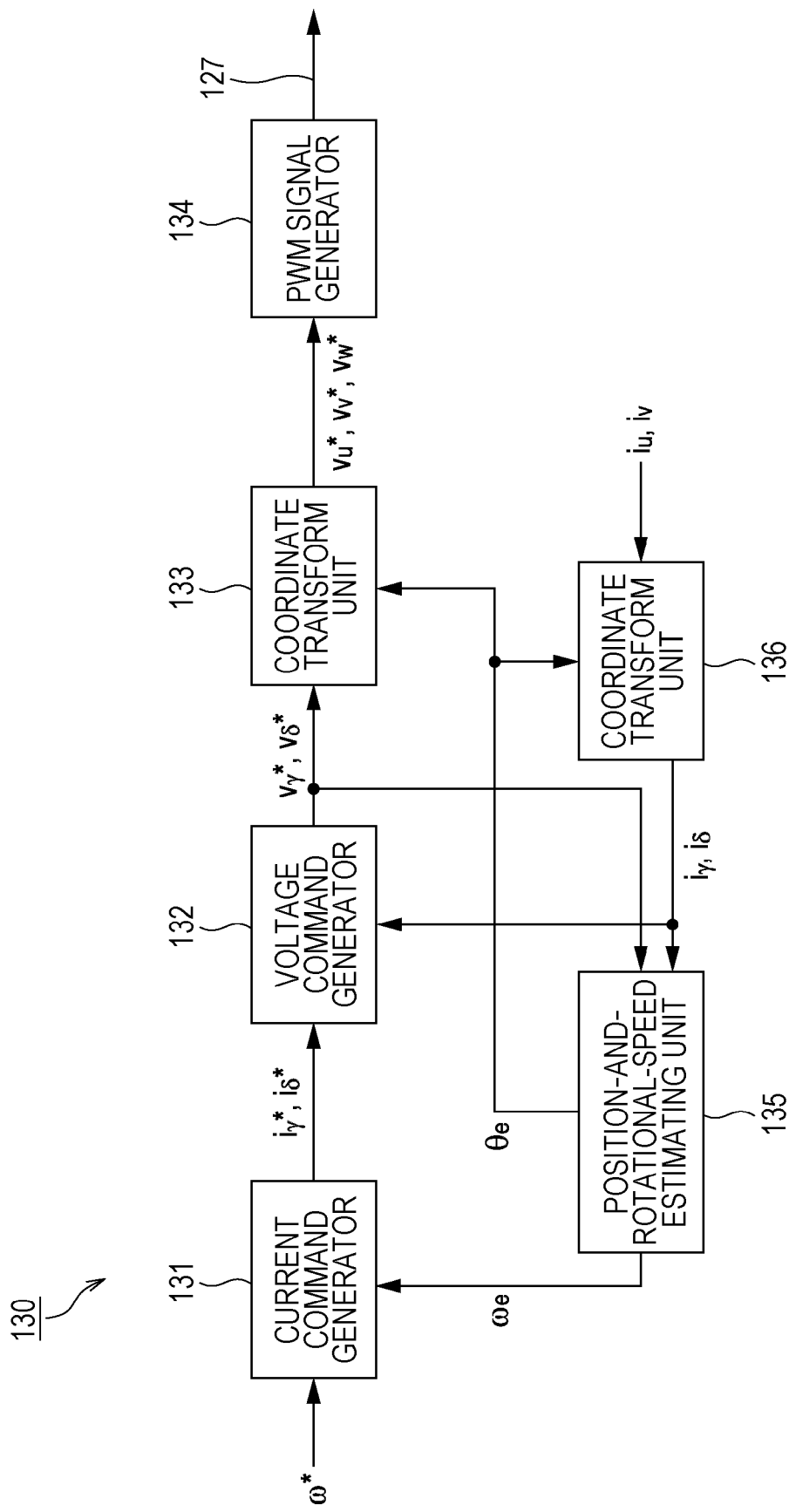
FIG. 3 is a block diagram of a converter control unit in the first embodiment.

The converter control unit 130 includes, as shown in FIG. 3, a current, command generator 131, a voltage command, generator 132, a coordinate transform unit 133, a PWM signal generator 134, a position-and-rotational-speed estimating unit 135, and a coordinate transform unit 136.

Figure 4:
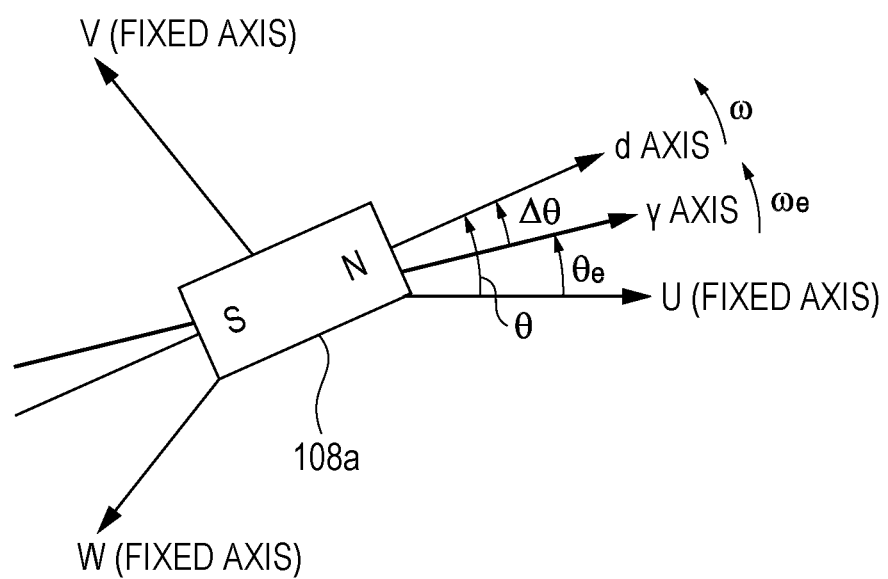
FIG. 4 illustrates a dq coordinate system and a γδ coordinate system.

The operation of the components of the converter control unit 130 may be described by using a γδ coordinate system. The γδ coordinate system will be discussed below with reference to FIG. 4 while referring to a dq coordinate system.

The dq coordinate system is a rotating coordinate system. The d axis and the q axis rotate at the same rotational speed as that of magnetic flux generated by a permanent magnet 108a, which is a permanent magnet in the rotor of the generator 108. For easy representation, the q axis is not shown in FIG. 4. The counterclockwise direction is a phase advancing direction. The d axis is set to be an axis extending in the direction of magnetic flux generated by the permanent magnet 108a. The q axis is set to be an axis generated, by rotating the d axis by 90 degrees in the phase advancing direction. The U axis corresponds to the U-phase winding 123u. The V axis corresponds to the V-phase winding 123v. The W axis corresponds to the W-phase winding 123w. The U axis, V axis, and W axis are not rotated even if the rotor is rotated. That is, the U axis, V axis, and W axis are fixed axes. The actual rotor position θ is a lead angle of the d axis, as viewed from the U axis. In this specification, the angle refers to an electrical angle unless otherwise specified.

The γδ coordinate system, is a rotating coordinate system. The γ axis is set to be an estimated axis (control axis) corresponding to the d axis. The δ axis is set to be an axis generated by rotating the γ axis by 90 degrees in the phase advancing direction. For easy representation, the δ axis is not shown in FIG. 4. An estimated position $\theta_e$ is a lead angle of the γ axis, as viewed from the U axis. The estimated rotational speed $\omega_e$ is a rotational speed of the γ axis (estimated axis or control axis).

An axis error Δθ is a lead angle of the d axis, as viewed from the γ axis. The axis error Δθ is calculated by $\Delta\theta=\theta-\theta_e$.

Referring back to FIG. 3, the individual components of the converter control unit 130 will be discussed below. For the sake of description, it will be assumed that, a period from, when a U-phase current $i_u$ and a V-phase current $i_v$ are input into the converter control unit 130 until when the converter control unit 130 outputs the control signal 127 is within the same control period.

On the basis of the U-phase current $i_u$, the V-phase current $i_v$, and the estimated position $\theta_e$, the coordinate transform unit 136 calculates a γ-axis current $i_\gamma$ and a δ-axis current $i_\delta$ and outputs them. The U-phase current $i_u$ and the V-phase current $i_v$ are values of currents detected by the current sensor 126. The estimated position $\theta_e$ used by the coordinate transform unit 136 is a position calculated by the position-and-rotational-speed estimating unit 135 in a past control period (typically, one previous control period).

On the basis of the γ-axis current $i_\gamma$, the δ-axis current $i_\delta$, a γ-axis target voltage $v_\gamma^*$, and a δ-axis target voltage $v_\delta^*$, the position-and-rotational-speed estimating unit 135 calculates an estimated position $\theta_e$ and an estimated rotational speed $\omega_e$, and outputs them. The γ-axis target voltage $v_\gamma^*$ and the δ-axis target voltage $v_\delta^*$ used by the position-and-rotational-speed estimating unit 135 are voltage values calculated by the voltage command generator 132 in a past control period (typically, one previous control period).

On the basis of a target rotational speed $\omega^*$ and the estimated rotational speed $\omega_e$, the current command generator 131 calculates a γ-axis target, current $i_\gamma^*$ and a δ-axis target current $i_\delta^*$ and outputs them. The target rotational speed $\omega^*$ may be generated in a host control device (not shown).

On the basis of the γ-axis current $i_\gamma$, the δ-axis current $i_\delta$, the γ-axis target current $i_\gamma^*$, and the δ-axis target current $i_\delta^*$, the voltage command generator 132 calculates a γ-axis target voltage $v_\gamma^*$ and a δ-axis target voltage $v_\delta^*$ and outputs them.

On the basis of the estimated position $\theta_e$, the γ-axis target voltage $v_\gamma^*$, and the δ-axis target voltage $v_\delta^*$, the coordinate transform unit 133 calculates three-phase target voltages $v_u^*$, $v_v^*$, and $v_w^*$ and outputs them. The three-phase target voltages $v_u^*$, $v_v^*$, and $v_w^*$ are a collective indication of the U-phase target voltage $v_u^*$, V-phase target voltage $v_v^*$, and W-phase target voltage $v_w^*$.

The PWM signal generator 134 generates the control signal 127, on the basis of the three-phase target voltages $v_u^*$, $v_v^*$, and $v_w^*$, and outputs the control signal 127. The control signal 127 is input into the converter circuit 125.

[Startup Operation]

In the startup operation, the expander 105 starts operating, and the rotational speed of the expander 105 is increased. In this case, the rotational speed of the expander 105 based on a difference between the state quantity at the inlet of the expander 105 and that at the outlet of the expander 105 is not controlled. As the state quantity, the pressure or the temperature may be used by way of example.

The startup operation is started when a command (signal) to start the operation of the Rankine cycle system 101 is input from an external source to the controller 128 of the power generation control system 102. A control sequence of the startup operation of the Rankine cycle system 101 will be described below with reference to FIGS. 5 and 6.

In step S100, the grid-interconnection power converter 122 starts operating to start grid interconnection. Then, AC power is supplied from the electrical grid 103 to the grid-interconnection power converter 122. The AC power is converted into DC power by the grid-inter connection power converter 122, thereby applying a DC voltage across the positive wire 124$p$ and the negative wire 124$n$. The grid-interconnection power converter 122 adjusts the magnitude of power to be supplied from the electrical grid 103 to the grid-interconnection power converter 122 such that the DC voltage to be applied across the positive wire 124$p$ and the negative wire 124$n$ will be a predetermined magnitude.

In step S110, the bypass valve 109 is opened. More specifically, in step S110, the opening degree of the bypass valve 109 is changed from zero to the maximum. In this case, the bypass valve 109 is opened to the full open position at one time. Alternatively, the opening degree of the bypass valve 109 may be increased to such a degree not to open the bypass valve 109 to the full open position. The bypass valve 109 may be opened gradually. In short, in step S110, the opening degree of the bypass valve 109 is increased.

In step S120, the controller 128 performs the following first control. The controller 128 causes the converter 120 to control the generator 108 such that the expander 105 is prevented from expanding a working fluid. In this embodiment, for example, the controller 128 causes the converter 120 to cause a DC current to flow through the generator 108, thereby preventing the expander 105 from expanding a working fluid. Since the generator 108 is connected to the shaft of the expander 105, when a current flows through the generator 108, a braking force is applied to the expander 105. Even if a pressure difference is generated between the inlet and the outlet of the expander 105, the expander 105 is not driven.

In step S130, the pump 107 starts operating. The pump 107 circulates a working fluid within the fluid circuit 150. When the pump 170 is started, it is highly likely that a working fluid contains a liquid, component since the temperature of the working fluid is low. However, there is no possibility that a working fluid will flow into the expander 105, since the expander 105 has been prevented from expanding a working fluid, before the start of the pump 107. Accordingly, the entirety of a working fluid flows through the pump 107, the evaporator 104, the bypass valve 109 (bypass channel 170), and the condenser 109 in this order.

In this example, step S130 is executed after step S120. However, steps S120 and S130 may be executed at the same time. That is, if, in the startup operation, the expander 105 is prevented from expanding a working fluid before the start of the pump 107, it is less likely that a working fluid containing a liquid component will flow into the expander 105.

Alternatively, step S130 may be executed, before step S120. That is, if a period, for which the expander 105 is prevented from expanding a working fluid is provided, even if a working fluid contains a liquid, component while the pump 107 is operating, it is less likely that this working fluid will flow into the expander 105, compared, with the related art. Accordingly, steps S120 and S130 may be interchangeable.

In step S140, a burner of a boiler in which the evaporator 104 is disposed is ignited. In this embodiment, the burner is ignited when the rotational speed, of the pump 107 has reached a threshold. After igniting the burner, a working fluid is heated in the evaporator 104.

In step S150, it is determined whether or not the temperature of a working fluid that has passed through the evaporator 104 is greater than a threshold. If the result of step S150 is YES, the process proceeds to step S160. In this embodiment, the temperature of a working fluid that has passed through, the evaporator 104 is measured by the temperature sensor 110, and the measured temperature is compared with the threshold. Alternatively, the pressure of a working fluid that has passed, through the evaporator 104 may be detected by a pressure sensor, and the temperature of the working fluid that has passed through the evaporator 104 may be estimated by the detected pressure. As the threshold, used in step S150, the temperature of a working fluid that does not contain a liquid component when it has passed through the evaporator 104 is set.

In step S160, second control in which the expander 105 is allowed to expand, a working fluid is performed. In this embodiment, the controller 128 causes the converter 120 to set the voltage across terminals of the generator 108 to be zero, thereby allowing the expander 105 to expand, a working fluid. By executing step S160, the state in which the expander 105 is prevented from expanding a working fluid is canceled. Then, on the basis of a difference between the pressure of a working fluid at the inlet of the expander 105 and that at the outlet of the expander 105, the expander 105 is operated. That is, a working fluid flows, not only into the bypass channel 107, but also into the expander 105. The converter 120 (converter control unit 130) estimates the position and the rotational speed of the rotor of the generator 108. That is, the converter 120 calculates the estimated position $\theta_e$ and the estimated rotational speed $\omega_e$.

In step S170, the converter 120 (converter control unit 130) determines whether or not the estimated rotational speed $\omega_e$ is greater than rotational speed (switching rotational speed) BC. If the result of step S170 is YES, the process proceeds to step S180.

In step S180, the controller 128 performs the following third control. The controller 128 causes the converter 120 to adjust the rotational speed of the generator 108 so as to control the rotational speed of the expander 105 (generator 108). In the third control, the rotational speed of the generator 108 is increased further. In this embodiment, the converter 120 (converter control unit 130) controls the rotational speed of the generator 108 such that the estimated rotational speed $\omega_e$ of the generator 108 will reach a target rotational speed instructed by the controller 128.

In step S190, it is determined whether or not the estimated rotational speed $\omega_e$ is greater than rotational speed (switching rotational speed) CN. If the result of step S190 is YES, the process proceeds to step S200.

In step S200, the bypass valve 109 is closed. When the bypass valve 109 is closed, the flow rate of a working fluid flowing through, the expander 105 is increased. More specifically, in step S200, the opening degree of the bypass valve 109 is changed, from the maximum to zero. In this case, the bypass valve 109 is closed at one time. Alternatively, the opening degree of the bypass valve 109 may be decreased to such a degree not to be zero. The bypass valve 109 may be closed gradually. In short, in step S200, the opening degree of the bypass valve 109 is decreased.

Figure 6:
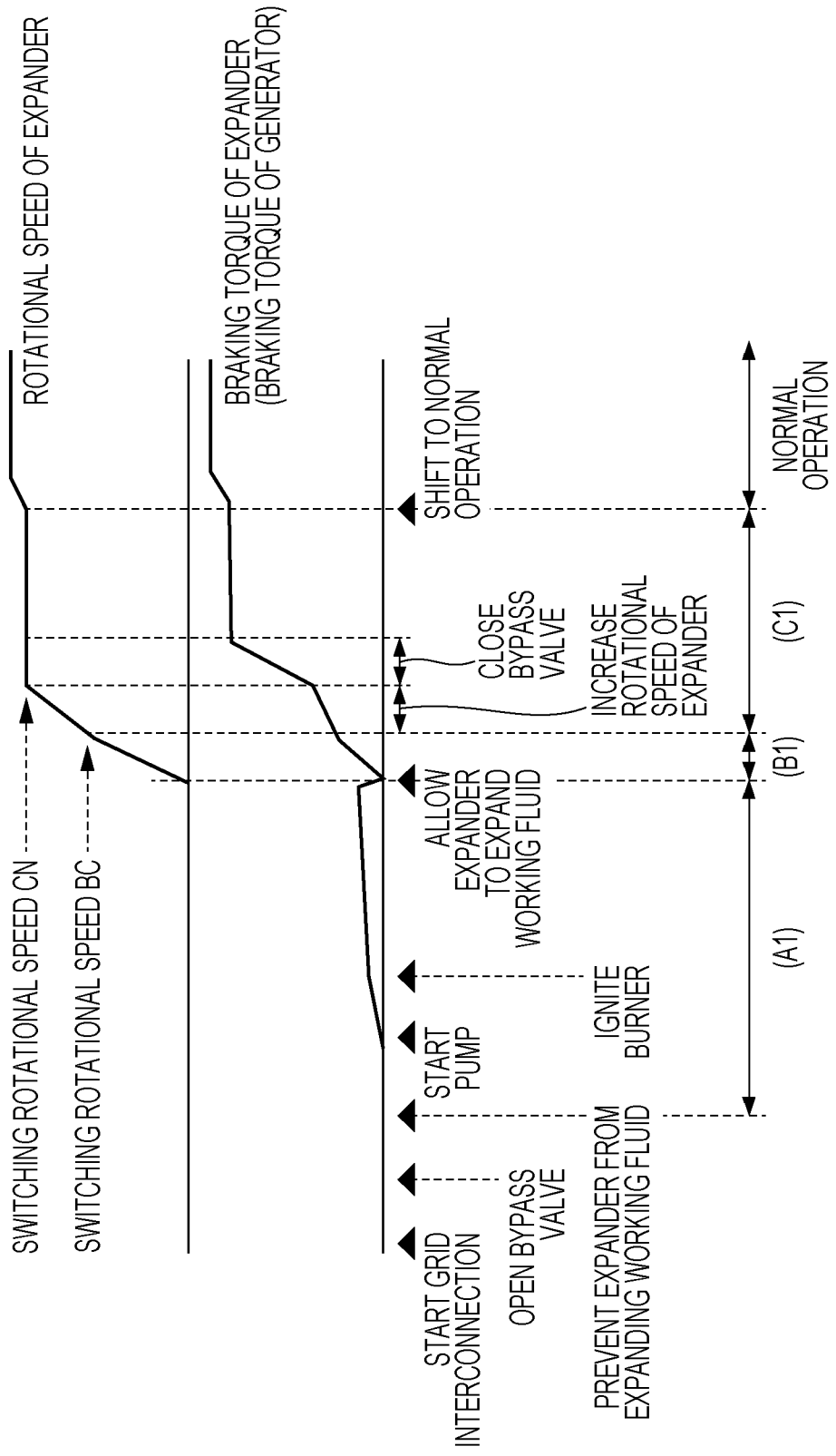
FIG. 6 illustrates a control sequence of a startup operation and also illustrates a change in the rotational speed of an expander and in braking torque of the expander during the startup operation.

Thereafter, in step S210, the startup operation shifts to the normal operation, thereby completing the startup operation. In the normal operation, the rotational speed of the expander 105 is controlled in a known manner on the basis of a difference between the state quantity at the inlet of the expander 105 and that at the outlet of the expander 105. As the state quantity, the pressure or the temperature may be used by way of example. For example, the rotational speed, of the generator 108 may be controlled, such that a difference between the pressure of a working fluid at the inlet of the expander 105 and that at the outlet, of the expander 105 is a predetermined value. The values of the pressure at the inlet and the outlet of the expander 105 may be detected, by a pressure sensor. Alternatively, the rotational speed, of the generator 108 may be controlled on the basis of an estimated value of the pressure (high-pressure side pressure) of a working fluid at the outlet of the evaporator 104. The estimated value of the high-pressure side pressure may be obtained from a current flowing through the generator 108 and the temperature of a working fluid at the outlet of the evaporator 104 (see Japanese Unexamined Patent Application Publication No. 2008-106946). If the rotational speed of the generator 108 is controlled by utilizing an estimated value of the high-pressure side pressure, a pressure sensor may be omitted. In FIG. 6, the startup operation (period C1) has been completed after the lapse of a predetermined time after the bypass valve 109 has been closed. In actual control, however, the startup operation may be terminated at a time point, when the bypass valve 109 is closed.

Figure 5:
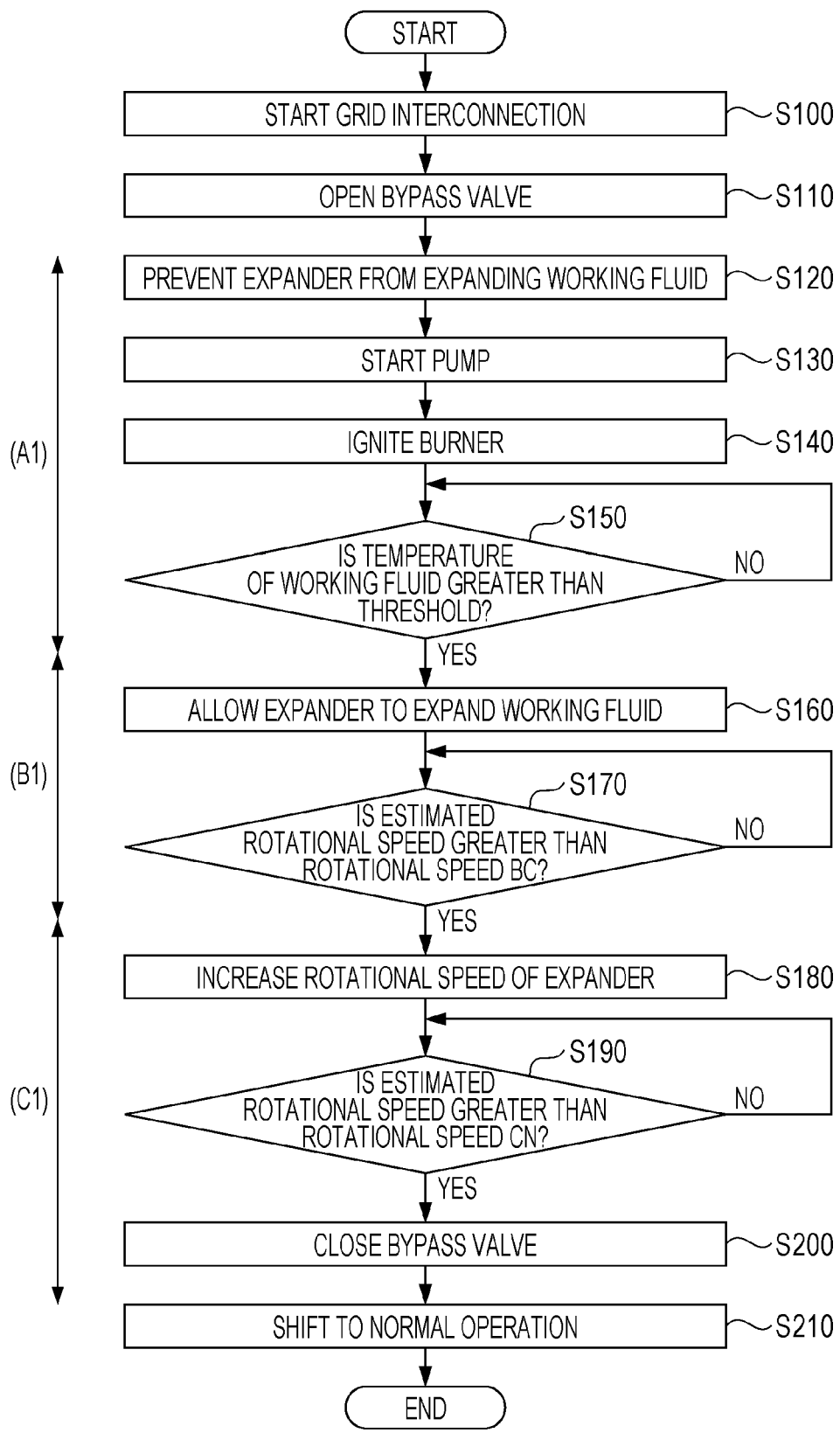
FIG. 5 is a flowchart of a startup operation in the first embodiment.

A period A1 in FIGS. 5 and 6 is a first period in which the first control is executed. It is sufficient that the first period, includes at least part of a period, for which a working fluid at the outlet of the evaporator 104 contains a liquid component. During the period A1, the expander 105 is prevented from expanding a working fluid. The period A1 corresponds to steps S120 through S150 of FIG. 5. A period B1 in FIGS. 5 and 6 is a second period, in which the second control is executed. In the second period, the converter 120 increases the rotational speed of the expander 105 without controlling the rotational speed of the generator 108. During the period B1, the expander 105 is allowed to expand a working fluid. The period B1 corresponds to steps S160 and S170 of FIG. 5. A period C1 in FIGS. 5 and 6 is a third period in which the third control is executed. In the third period, the controller 128 causes the converter 120 to control the rotational speed of the generator 108, thereby increasing the rotational speed of the expander 105. In the period C1, the rotational speed of the generator 108 (expander 105) is adjusted under the control of the controller 128 using the converter 120. The period C1 corresponds to steps S180 through S200 of FIG. 5.

During the period A1, a state in which the expansion of a working fluid is prevented continues. In the period A1 included in the startup operation of the Rankine cycle system 101, the controller 128 causes the converter 120 to control the generator 108 such that the expander 105 is prevented from expanding a working fluid. In the startup operation of this embodiment, the first control is started before the pump 107 starts. This makes it possible to reduce the possibility that a liquid working fluid be sucked into the expander 105. The first control may be started at the same time as the start of the pump 107. That is, the first control and the pump 107 may be started at the same time as long as the first control is started before the pump 107 starts operating.

If the temperature of a working fluid that, has passed through, the evaporator 104 exceeds a threshold, the control operation is shifted from the first control to the second control (step S150). For example, the period A1 may be a period for which a measured, value (or may be an estimated, value) of the temperature of a working fluid between the outlet of the evaporator 104 and the inlet of the expander 105 is equal to or smaller than the threshold. In this case, as the threshold, the temperature of a working fluid that does not contain a liquid component when it has passed through the evaporator 104 is set. However, as the threshold, the temperature of a working fluid that contains a liquid component when it has passed through the evaporator 104 may be set. That is, a desired value may be set as the threshold as long as at least part of a period for which a working fluid at the outlet of the evaporator 104 contains a liquid component is included in the period A1.

In the period B1, the expander 105 is allowed to expand a working fluid. In the period B1, the controller 128 does not perform control to cause the rotational speed of the generator 108 (expander 105) to follow the target rotational speed $\omega^*$. Instead, the controller 128 causes the converter 120 to set the voltage across terminals of the generator 108 to be zero, thereby allowing the expander 105 to expand a working fluid. With this operation, in the period B1, due to a difference between the pressure of a working fluid, at the inlet of the expander 105 and that at the outlet of the expander 105, the rotational speed, of the generator 108 starts increasing gradually from zero.

In the period C1, the rotational speed of the generator 108 is adjusted. In the period C1, the controller 128 causes the converter 120 to control the generator 108 so as to adjust the rotational speed of the generator 108.

In the period A1, the generator 108 does not generate power. In the period B1, the controller 128 of this embodiment still does not supply power from the generator 108 to the pump driving circuit 121. In the first control and the second control, AC power is supplied from the electrical grid 103 to the grid-interconnection power converter 122. The grid-interconnection power converter 122 converts the supplied AC power into DC power, thereby generating a DC voltage across the positive wire 124p and the negative wire 124n. This DC voltage is applied to the converter 120. That is, power to be supplied to the converter 120 for preventing the expander 105 from expanding a working fluid is supplied from the electrical grid 103 to the converter 120 via the grid-interconnection power converter 122. A DC voltage generated in the DC cable 124 is also applied, to the pump driving circuit 121. That is, power to be supplied to the pump driving circuit 121 for driving the pump 107 is also supplied, from the electrical grid 103 to the pump driving circuit 121 via the grid-interconnection power converter 122.

In the period C1 and in the normal operation, the generator 108 generates power. The converter 120 converts generated AC power into DC power, thereby generating a DC voltage across the positive wire 124p and the negative wire 124n. This DC voltage is applied to the pump driving circuit 121. That is, power generated in the generator 108 is supplied to the pump driving circuit 121 via the converter 120. If power output, from the converter 120 is smaller than power that, should be supplied, to the pump driving circuit 121, a shortage is supplied from, the electrical grid 103 to the pump driving circuit 121 via the grid-interconnection power converter 122. If power output from, the converter 120 is greater than power that, should be supplied, to the pump driving circuit 121, a surplus is supplied to the electrical grid 103 via the grid-interconnection power converter 122. That is, power generated in the generator 108 is also supplied to the electrical grid 103 via the converter 120 and the grid-interconnection power converter 122.

In this embodiment, the power generation apparatus 100 decreases the opening degree of the bypass valve 109 after the completion of the third control. However, the time at which the opening degree of the bypass valve 109 is decreased is not restricted to this timing. The power generation apparatus 100 may perform control such that the opening degree of the bypass valve 109 is decreased at any time from when the third control is started until when the startup operation has been completed. In other words, the power generation apparatus 100 may perform, control in any manner as long as the opening degree of the bypass valve 109 at the end of the startup operation is smaller than that at the start of the third control. For example, while the third control is being executed, the power generation apparatus 100 may perform control such that the opening degree of the bypass valve 109 is decreased. In addition to or instead of the adjusting of the opening degree of the bypass valve 109 in the third control, the power generation apparatus 100 may adjust the opening degree of the bypass valve 109 while executing the second control. More specifically, the power generation apparatus 100 may decrease the opening degree of the bypass valve 109 in the second control such that the opening degree of the bypass valve 109 at the end of the second control is smaller than that at the start of the second control.

(Operation of Converter Control Unit 130 in First Control, Second Control, and Third Control)

The converter control unit 130 shown in FIG. 3 operates in each of the first control, the second control, and the third control by using the following equations.

$$\Delta\theta = \begin{cases} 0 & (1\text{-}A) \\ \tan^{-1}\dfrac{-(v_\gamma^* - (R+L_d s)i_\gamma + \omega_e L_q i_\delta)}{v_\delta^* - (R+L_d s)i_\delta - \omega_e L_q i_\gamma} & (1\text{-}B), (1\text{-}C) \end{cases}$$

$$\omega_e = \left(K_{\text{pll\_p}} + \frac{K_{\text{pll\_i}}}{s}\right)\Delta\theta \qquad (2)$$

$$\theta_e = \frac{\omega_e}{s} + \theta_0 \qquad (3)$$

$$v_\gamma^* = \begin{cases} \left(K_{pi} + \dfrac{K_{ii}}{s}\right)(0 - i_\gamma) & (4\text{-}A) \\ 0 & (4\text{-}B) \\ \left(K_{pi} + \dfrac{K_{ii}}{s}\right)(i_\gamma^* - i_\gamma) & (4\text{-}C) \end{cases}$$

$$v_\delta^* = \begin{cases} \left(K_{pi} + \dfrac{K_{ii}}{s}\right)(i_{\delta 0}^* - i_\delta) & (5\text{-}A) \\ 0 & (5\text{-}B) \\ \left(K_{pi} + \dfrac{K_{ii}}{s}\right)(i_\delta^* - i_\delta) & (5\text{-}C) \end{cases}$$

$$i_\gamma^* = 0 \qquad (6)$$

$$i_\delta^* = \left(K_{ps} + \frac{K_{is}}{s}\right)(\omega^* - \omega_e) \qquad (7)$$

Equations (1-A), (1-B), (1-C), (2), and (3) are used by the position-and-rotational-speed estimating unit 135 when calculating the axis error $\Delta\theta$, the estimated rotational speed $\omega_e$, and the estimated position $\theta_e$. Equations (1-A), (1-B), and (1-C) are used in the first control, the second control, and the third control, respectively. Equations (2) and (3) are used, for all of the first control, the second control, and the third control. In equations, s is a Laplace operator, R is an armature resistance of the generator 108, $L_d$ is a d-axis inductance, $L_q$ is a q-axis inductance, $K_{p11\_p}$ is a proportional gain, $K_{p11\_i}$ is an integral gain, and $\theta_0$ is an initial estimated position. $K_{p11\_p}$ and $K_{p11\_i}$ are set for controlling a phase locked loop (PLL). For understanding the meanings of the above-described equations, see a known document (for example, see Japanese Patent No, 4480696 which discloses a technique for estimating the position and the rotational speed, of a rotor of a motor).

Equations (4-A), (4-B), (4-C), (5-A), (5-B), and, (5-C) are used by the voltage command generator 132 for calculating the γ-axis target voltage $v_\gamma^*$ and the δ-axis target voltage $v_\delta^*$.

Equations (4-A) and (5-A) are used in the first control. Equations (4-B) and (5-B) are used in the period B1. Equations (4-C) and (5-C) are used in the period C1. In equations, $K_{pi}$ is a proportional gain, and $K_{ii}$ is an integral gain. $K_{pi}$ and $K_{ii}$ are set for controlling the proportional integral (PI) of a current $I_{\delta0}*$ is a target current, which is a predetermined value. The voltage command generator 132 has a PI controller.

Equations (6) and (7) are used by the current command generator 131 for calculating the γ-axis target current $i_\gamma*$ and the δ-axis target current $i_\delta*$. Equations (6) and (7) are used during the period C1. In equation (7), $K_{ps}$ is a proportional gain, and $K_{is}$ is an integral gain. $K_{ps}$ and $K_{is}$ are set for controlling PI of the rotational speed of the generator 108. The current command generator 131 has a PI controller.

In the first control, the voltage command generator 132 is operated by using equations (4-A) and (5-A). As a result of this operation, the γ-axis current $i_\gamma$ is calculated as zero, and the δ-axis current $i_\delta$ is calculated as $I_{\delta0}*$. In the first control, the position-and-rotational-speed estimating unit 135 is operated by using equations (1-A), (2), and (3). As a result of this operation, the axis error Δθ is calculated as zero, the estimated rotational speed $\omega_e$ is calculated as zero, and the estimated position $\theta_e$ is fixed to be the initial estimated value $\theta_0$. In the first control, the γ-axis target current $i_\gamma*$ and the δ-axis target current $i_\delta*$ calculated by the current command generator 131 are not used.

As is seen from the foregoing description, in the first control, the γδ coordinates are not rotated. The control signal 127 for causing a DC current to flow through the generator 108 is output from the converter control unit 130. The DC current restricts an operation of the rotor of the generator 108. That is, the rotor of the generator 108 is not rotated, thereby preventing the expander 105 from expanding a working fluid. In short, in the first control, the controller 128 of this embodiment causes the converter 120 to cause a DC current to flow through the generator 108 so as to restrict the operation of the rotor of the generator 108. In this embodiment, the DC current is a constant current having a fixed magnitude.

During the period B1, the voltage command generator 132 is operated by using equations (4-B) and (5-B). As a result of this operation, the γ-axis target voltage $v_\gamma*$ and the δ-axis target voltage $v_\delta*$ are calculated as zero. The U-phase target voltage $v_u*$, V-phase target voltage $v_v*$, and W-phase target voltage $v_w*$ are also calculated as zero. The voltage at each terminal of the generator 108 is zero, and the voltage across terminals of the generator 108 is also zero. Accordingly, immediately after shifting from the first control to the second control, a current does not flow through the generator 108, thereby canceling the state in which the operation of the rotor of the generator 108 is restricted. In the period B1, as well as in the period A1, the γ-axis target current $i_\gamma*$ and the δ-axis target current $i_\delta*$ calculated by the current command generator 131 are not used.

At the start of the period B1, due to the difference between the pressure of a working fluid at the inlet of the expander 105 and that at the outlet of the expander 105, the rotational speed of the expander 105 and that of the generator 108 start increasing gradually from zero. In accordance with the operation of the generator 108, an induced voltage is generated within the generator 108 and gradually increases. Then, a current based on the difference between a terminal voltage (zero voltage) and the induced voltage starts to flow between, the inside of the generator 108 and a terminal of the generator 108, and this current gradually increases. That is, braking torque (braking force) is generated in the generator 108 and gradually increases. The braking torque gradually approximates driving torque based on the difference between the pressure of a working fluid at the inlet of the expander 105 and that at the outlet of the expander 105.

In the period B1, the position-and-rotational-speed estimating unit 135 calculates the axis error Δθ, the estimated rotational speed $\omega_e$, and the estimated position $\theta_e$ by using equations (1-B), (2), and (3). When the estimated rotational speed $\omega_e$ has reached the switching rotational speed BC, the operation is shifted from the second control to the third control. As discussed above, in this embodiment, in the period B1, the converter control unit 130 estimates the rotational speed of the generator 108 (rotational speed of the expander 105) on the basis of the value of a voltage across terminals of the generator 108 and the detected value of a current flowing through the generator 108. The converter control unit 130 determines the timing at which, the operation is shifted from the second control to the third, control, on the basis of the estimated rotational speed $\omega_e$ of the generator 108. In this embodiment, the switching rotational speed. BC is set such, that the operation is shifted from the second control to the third control before the braking torque of the generator 108 which is generated by a current flowing through, the generator 108 in accordance with the operation of the generator 108 matches the driving torque of the generator 108 generated due to the difference between the pressure of a working fluid, at the inlet of the expander 105 and that at the outlet of the expander 105. The converter control unit 130 may be configured such that the operation is shifted from the second control to the third control after the lapse of a predetermined time (for example, about 0.1 to 10 seconds, in particular, preferably about 0.5 to 2 seconds) upon the start of the second control.

Equations (1-B), (2), and (3) show that, in the period B1, the axis error Δθ converges to zero and that the error between the estimated rotational speed $\omega_e$ and the actual rotational speed ω also converges to zero. By setting the period B1, before starting the period C1 in which, the rotational speed of the generator 108 is adjusted, the axis error Δθ can be reduced to substantially zero, and the error between the estimated rotational speed $\omega_e$ and the actual rotational speedω can be reduced to substantially zero. That is, by setting the period B1, it is possible to smoothly start rotational-speed control (control in the period C1) and to stabilize position sensorless control performed by the converter 120 in the period C1.

In the period C1, the current command, generator 131 is operated, by using equations (6) and (7). As a result of this operation, the γ-axis target current $i_\gamma*$ and the δ-axis target current $i_\delta*$ are calculated such that the estimated rotational speed $\omega_e$ coincides with the target rotational speed ω*. In the period C1 or this embodiment, the γ-axis target current $i_\gamma*$ is set to be zero. In the period C1, the voltage command generator 132 is operated by using equations (4-C) and (5-C). As a result, of this operation, the γ-axis current $i_\gamma$ and the δ-axis current $i_\delta$ follow the γ-axis target current $i_\gamma*$ and the δ-axis target current $i_\delta*$, respectively. In the period C1, the position-and-rotational-speed estimating unit 135 calculates the axis error Δθ, the estimated rotational speed $\omega_e$, and the estimated position $\theta_e$ by using equations (1-C), (2), and (3).

In the period C1 of this embodiment, the converter control unit 130 estimates the rotational speed of the generator 108 (rotational speed of the expander 105) and the position of the rotor of the generator 108. The converter control unit 130 also adjusts the rotational speed of the generator 108 on the basis of the estimated rotational speed of the expander 105 such that, the estimated rotational speed $\omega_e$ follows the target rotational speed ω*. In the period C1 of this embodiment, the target rotational speed ω* is gradually increased. When the estimated rotational speed $\omega_e$ has reached the switching rotational speed CN, the bypass valve 109 is closed. As the switching rotational speed CN, the rotational speed of the rotor from which the position of the rotor can be estimated is set. This is because, if the rotational speed of the rotor of the generator 108 is low, it is difficult to check the position of the rotor. Since the target rotational speed ω* and the estimated rotational speed $\omega_e$ almost simultaneously reach the switching rotational speed CN, it would be possible to say that the bypass valve 109 is closed when the target rotational speed ω* has reached the switching rotational speed CN. Then, the operation is shifted from the third control to the normal operation. The operation of the power generation control system 102 in the normal operation is similar to that in the third control. In this embodiment, the target rotational speed ω* is supplied to a bypass valve control circuit (not shown).

[Shutdown Operation]

In a shutdown operation, the rotational speed of the expander 105 is decreased so as to stop the operation of the expander 105. The shutdown operation is started when a command (signal) to stop the operation of the Rankine cycle system 101 is input from an external source to the controller 128 of the power generation control system 102. A control sequence of the shutdown operation of the Rankine cycle system 101 will be described below with reference to FIGS. 7 and 8.

In step S500, the bypass valve 109 is opened. With the opening of the bypass valve 109, the difference between the pressure of a working fluid, at the inlet of the expander 105 and that at the outlet of the expander 105 starts to decrease. More specifically, in step S500, the opening degree of the bypass valve 109 is changed from zero to the maximum. In this case, the bypass valve 109 is opened to the full open position at one time. Alternatively, the opening degree of the bypass valve 109 may be increased, to such a degree not to open the bypass valve 109 to the full open position. The bypass valve 109 may be opened gradually. In short, in step S500, the opening degree of the bypass valve 109 is increased.

In step S510, it is determined whether or not the difference between the pressure of a working fluid at the inlet of the expander 105 and that at the outlet of the expander 105 (inlet/outlet pressure difference) is smaller than switching pressure NC. If the result of step S510 is YES, the process proceeds to step S520. In this embodiment, until the process proceeds to step S520, the rotational speed of the expander 105 is maintained as a result, of the controller 128 causing the converter 120 to control the rotational speed of the generator 108. As the switching pressure NC, for example, the inlet/outlet pressure difference at which the operation of the rotor of the generator 108 can be restricted when executing step S560 in which the expander 105 is prevented, from expanding a working fluid is set. The reason for this is that, if the inlet/outlet pressure difference is large, driving torque of the expander 105 increases, and thus, it is not possible to restrict the operation of the rotor of the generator 108 in step S560.

In step S520, the controller 128 causes the converter 120 to execute fourth control in which the expander 105 (generator 108) is decelerated by adjusting the rotational speed of the generator 108.

In step S530, it is determined whether or not the estimated rotational speed $\omega_e$ is smaller than switching rotational speed CB. If the result of step S530 is YES, the process proceeds to step S540.

In step S540, the controller 128 starts fifth control to stop the expander 105. More specifically, in the fifth control, the voltage across terminals of the generator 108 is reduced to zero so as to generate braking torque, thereby decelerating the expander 105. In the fifth control, the rotational speed of the expander 105 is decreased. As the switching rotational speed CB, the rotational speed of the generator 108 at which an overcurrent does not flow through the converter 120, which would otherwise cause a breakdown of the converter 120, when the operation is shifted to control for stopping the expander 105 is set. The reason for this is that, if control for stopping the expander 105 is started when the rotational speed of the generator 108 is high, an overcurrent may flow through the converter 120 and cause a breakdown of the converter 120.

In step S550, it is determined whether or not the estimated rotational speed $\omega_e$ is smaller than switching rotational speed BA. If the result of step S550 is YES, the process proceeds to step S560.

In step S560, the first, control is executed in which the controller 128 causes the converter 120 to control the generator 108 such that the expander 105 is prevented from, expanding a working fluid. In this embodiment, the controller 128 causes the converter 120 to cause a DC current to flow through the generator 108 so as to prevent the expander 105 from expanding a working fluid. In this embodiment, the process proceeds to step S570 after the lapse of a predetermined time upon the start of the first control. As the switching rotational speed BA, the rotational speed of the generator 108 at which the expander 105 can be prevented from, expanding a working fluid as a result of the controller 128 causing the converter 120 to control the generator 108 is set. The reason for this is that, if the rotational speed of the generator 108 is high, it is difficult to prevent the expander 105 from expanding a working fluid as a result of the controller 128 causing the converter 120 to control the generator 108.

In this case, when the process proceeds to step S560, a working fluid at the outlet of the evaporator 104 preferably does not contain a liquid component. This is because, even if a liquid component is added to a working fluid later due to a decrease in the temperature of the working fluid, such a liquid component does not flow into the expander 105. However, if a period for which the expander 105 is prevented from expanding a working fluid is provided, even if a working fluid, at the outlet, of the evaporator 104 contains a liquid component while the pump 107 is operating, the possibility that such a liquid component will flow into the expander 105 is lower, compared with the related art. Accordingly, when the process proceeds to step S560, even if a working fluid at the outlet of the evaporator 104 contains a liquid component, such a liquid component is negligible.

In step S570, the burner of the boiler in which the evaporator 104 is disposed is turned OFF. Even after the burner is turned OFF, a working fluid supplied from the pump 107 by pressure is heated in the evaporator 104 and is cooled in the condenser 106. However, since the burner is turned OFF, the temperature of the working fluid gradually decreases.

In step S580, it is determined whether or not the temperature of a working fluid that has passed through the evaporator 104 is smaller than, a threshold. If the result of step S580 is YES, the process proceeds to step S590. In this case, as the threshold, the temperature of a working fluid that contains a liquid component when it has passed through the evaporator 104 is set.

In step S590, the operation of the pump 107 is stopped. Then, the process proceeds to step S600.

In step S600, power supply from the converter 120 to the generator 108 is terminated. Then, the shutdown operation has been completed.

Figure 7:
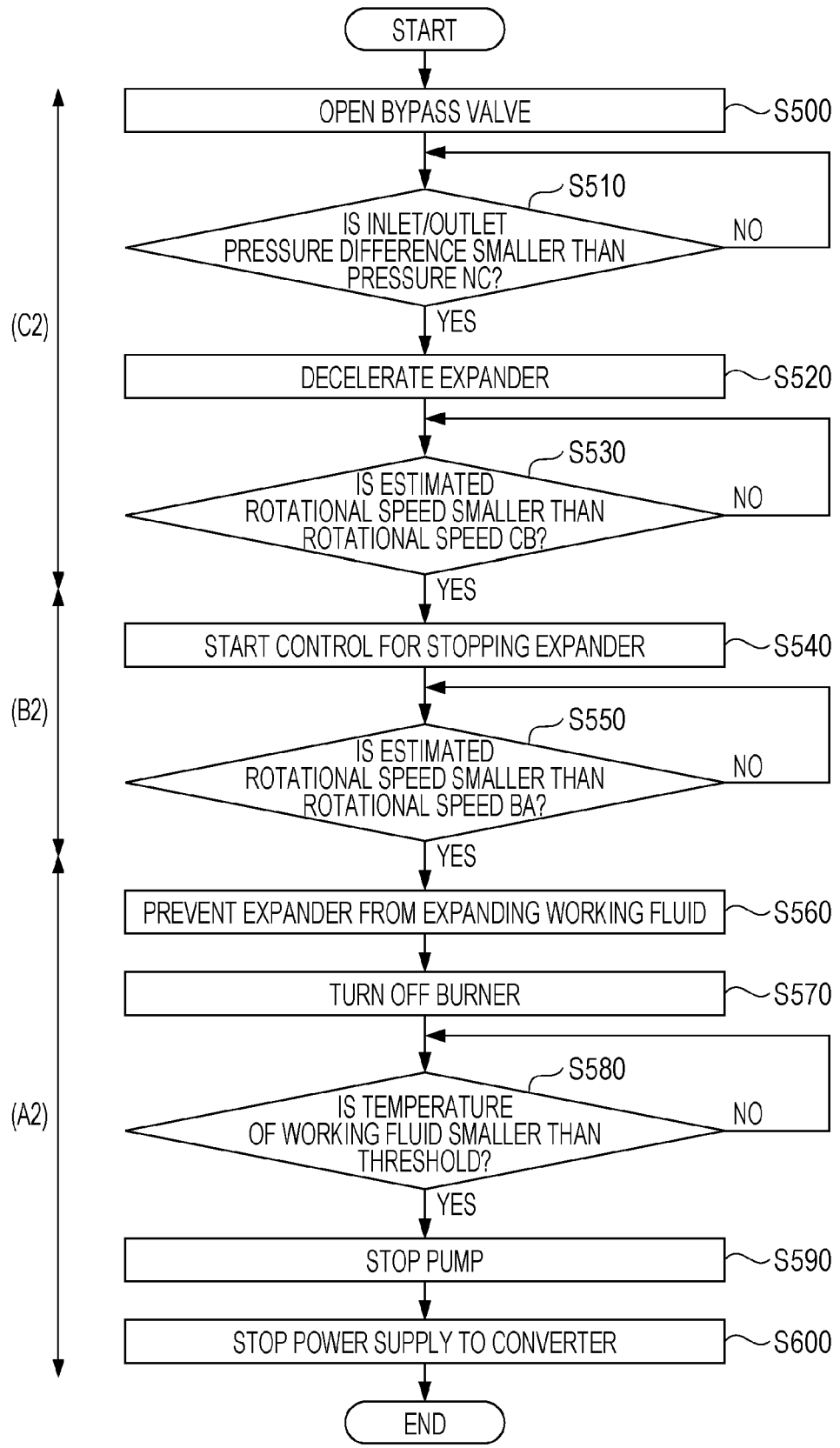
FIG. 7 is a flowchart of a shutdown operation in the first embodiment.
Figure 8:
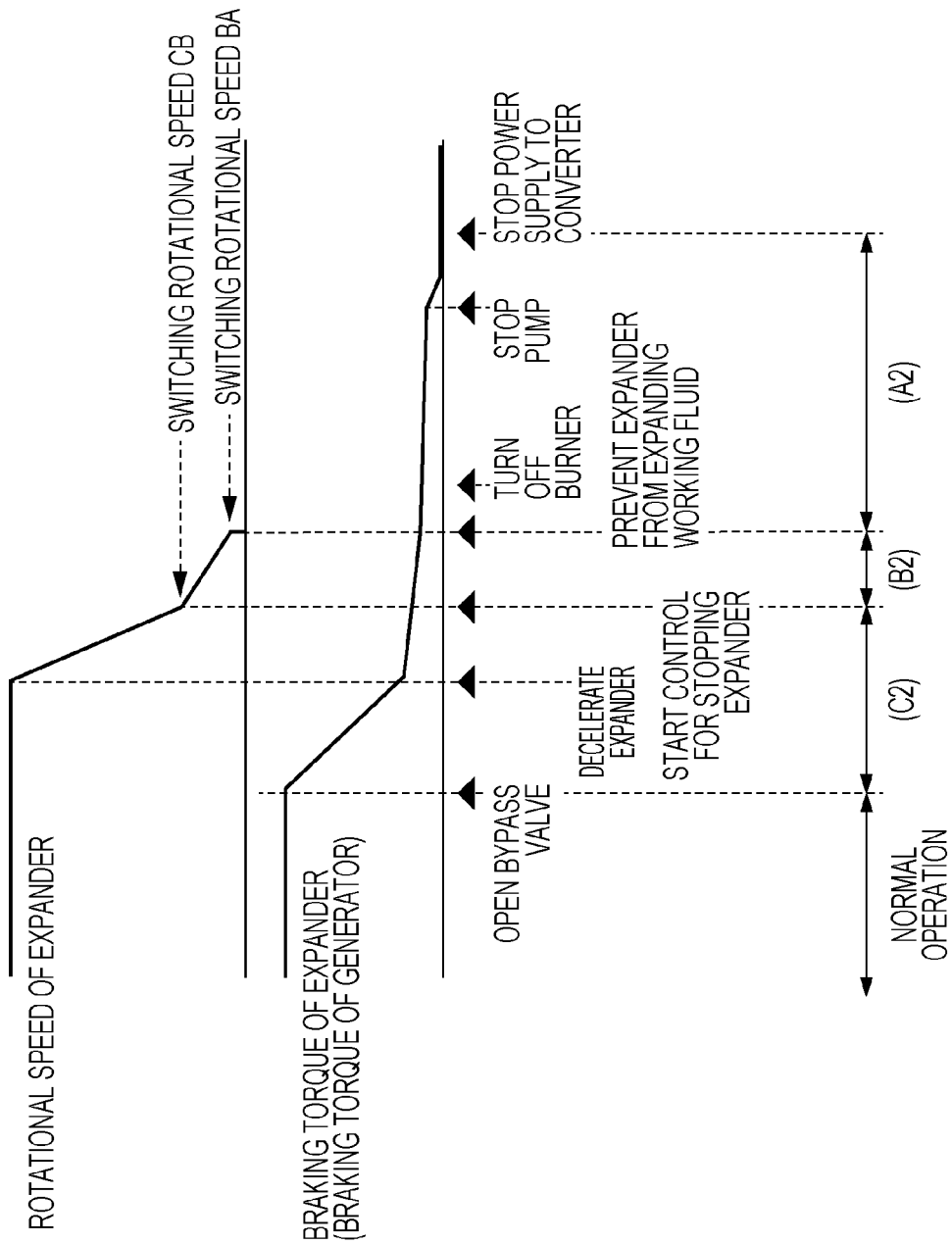
FIG. 8 illustrates a control sequence of a shutdown operation and also illustrates a change in the rotational speed of the expander and in braking torque of the expander during the shutdown operation.

A period C2 in FIGS. 7 and 8 is a sixth period in which the fourth control is executed. In the sixth period, the controller 128 causes the converter 120 to control the rotational speed of the generator 108 so as to decrease the rotational speed of the expander 105. In the period C2, the rotational speed of the generator 108 (expander 105) is adjusted as a result of the controller 128 causing the converter 120 to perform control. The period C2 corresponds to steps S500 through. S530 of FIG. 7. A period B2 in FIGS. 7 and 8 is a fifth period in which the fifth control is executed. In the fifth period, the converter 120 decreases the rotational speed of the expander 105 without controlling the rotational speed of the generator 108. In the period B2, control for stopping the expander 105 is performed. The period B2 corresponds to steps S540 and S550 of FIG. 7. A period A2 in FIGS. 7 and 8 is a fourth period in which the first control is executed. It is sufficient that the fourth period includes at least part of a period for which a working fluid at the outlet of the evaporator 104 contains a liquid component. In the period A2, the expander 105 is prevented from expanding a working fluid. The period A2 corresponds to steps S560 through S600.

In the period C2, the rotational speed of the generator 108 is adjusted by the converter 120. In the period C2, the rotational speed of the generator 108 is decreased as a result of the controller 128 causing the converter 120 to perform control. In the period B2, as well as in the period C2, the expander 105 is allowed, to expand a working fluid. In the period B2, the rotational speed, of the generator 108 is decreased as a result, of the controller 128 performing control for stopping the expander 105. In the period A2, the expander 105 is prevented from expanding a working fluid.

In the shutdown operation of this embodiment, the period A2 is started while the pump 107 is operating and while the bypass valve 109 is open, and before the burner of the boiler in which the evaporator 104 is disposed is turned OFF to stop heating a working fluid. With this configuration, it is possible to reduce the possibility that a liquid working fluid be sucked into the expander 105 during the shutdown operation.

In the shutdown operation of this embodiment, the first control is not terminated before the pump 107 stops operating. With this configuration, it is possible to reduce the possibility that a liquid working fluid be sucked into the expander 105 at a late stage of the shutdown operation. The first control may be terminated, at the same time as stopping of the operation of the pump 107. That is, the first control and the pump 107 may be stopped, at the same time as long as the first control is not terminated, before the pump 107 stops operating.

The techniques discussed in the startup operation are applicable to the shutdown operation as long as there is no inconsistency in such an application. Conversely, the techniques discussed, in the shutdown operation are applicable to the startup operation as long as there is no inconsistency in such an application.

(First Modified Example)

The approach to preventing the expander 105 from expanding a working fluid in at least one of the startup operation and the shutdown operation is not restricted to flowing of a DC current through the generator 108. In a first modified example, the converter 120 causes an AC current to flow through the generator 108 so as to reversely rotate the generator 108. Then, the rotor of the generator 108 is reversely rotated slowly. That is, the expander 105 compresses a working fluid. In this approach, it is also possible to prevent the expander 105 from expanding a working fluid. In short, in the first modified example, the expander 105 also serves as a compressor. In at least one of the startup operation and the shutdown, operation, the controller 128 causes the converter 120 to control the generator 108 such that the expander 105 compresses a working fluid, thereby preventing the expander 105 from expanding a working fluid.

In the first modified, example, instead, of a DC current, an AC current flows through the generator 108. Accordingly, a current does not intensively flow through a specific phase of the generator 108. This is preferable in terms of avoiding the generator 108 from locally generating heat.

In the first modified example, in at least one of the startup operation and the shutdown operation, the position-and-rotational-speed estimating unit 135 is operated by using equation (8) instead of equation (2) when executing the first control:

$$\omega_e = \epsilon \qquad (8)$$

where $\epsilon$ is a rotational-speed command (constant value) for reversely rotating the rotor of the generator 108 (for compressing a working fluid). As in the above-described first embodiment, in at least one of the startup operation and the shutdown operation, the voltage command generator 132 is operated by using equations (4-A) and (5-A). The $\gamma$-axis target current $i_\gamma^*$, and the $\delta$-axis target current $i_\delta^*$ calculated by the current command generator 131 are not utilized.

In the first modified, example, the position-and-rotational-speed estimating unit 135 calculates an estimated position $\theta_e$ by using $\omega_e$ ($=\epsilon$) expressed by equation (8) and equation (3). The estimated position $\theta_e$ varies at a constant velocity. The coordinate transform unit 133 calculates three-phase target voltages $v_u^*$, $v_v^*$, and $v_w^*$ by using the estimated, position $\theta_e$, and the PWM signal generator 134 generates the control signal 127 by using the three-phase target voltages $v_u^*$, $v_v^*$, and $v_w^*$. As a result, $\epsilon$, which is a value for causing the expander 105 to compress a working fluid, is reflected in the control signal 127.

(First Mode Of Second Modified Example)

The period A1 is not restricted to a period for which a measured value or an estimated value of the temperature of a working fluid that has passed through the evaporator 104 is equal to or smaller than a threshold. In a first mode of a second modified example, the period A1 is a period, for which a measured value or an estimated value of the pressure of a working fluid that has passed through the evaporator 104 is equal to or smaller than a threshold. In this case, as the threshold, the pressure of a working fluid that does not contain a liquid component when it has passed through the evaporator 104 is set. However, as the threshold, the pressure of a working fluid that contains a liquid component when it has passed through the evaporator 104 may be set. That is, a desired value may be set as the threshold as long as at least part of a period for which a working fluid at the outlet of the evaporator 104 contains a liquid component is included in the period A1. By setting the period A1 in this manner, too, it is possible to shift the operation from the first control to the second control at an appropriate timing. The period A1 is an example of the first period in which the first control is executed. A value of the pressure of a working fluid, may be measured by a pressure sensor. A value of the pressure may be estimated from the temperature of a working fluid that has passed, through the evaporator 104 and torque of the generator 108. The torque of the generator 108 may be calculated, from a current flowing through the generator 108.

(Second Mode Of Second Modified Example)

In a second mode of the second modified example, the period A1 is a period from when the controller 128 starts to prevent the expander 105 from expanding a working fluid until a predetermined time elapses. The period A1 is an example of the first period in which the first control is executed. This predetermined time is set in advance by checking the correlation between a time elapsed after the boiler is ignited and the temperature of a working fluid. More specifically, this predetermined time is set on the basis of a period from when the evaporator 104 starts heating a working fluid until when a measured value or an estimated value of the temperature of a working fluid that has passed through the evaporator 104 exceeds a threshold and also on the basis of a time difference between the timing at which the controller 128 starts to prevent, the expander 105 from expanding a working fluid and the timing at which the evaporator 104 starts heating a working fluid. In the example shown in FIG. 6, the predetermined time is the total time of the above-described time difference and the period from when the evaporator 104 starts heating a working fluid until when a measured value or an estimated value of the temperature of a working fluid that has passed through the evaporator 104 exceeds a threshold. In this case, as the threshold, the temperature of a working fluid that does not contain a liquid component when it has passed through the evaporator 104 is set. However, the temperature of a working fluid that contains a liquid component when it has passed through the evaporator 104 may be set as the threshold. That is, a desired value may be set as the threshold as long as at least part of a period for which a working fluid at the outlet of the evaporator 104 contains a liquid component is included in the period A1.

As in the first, and second modes of the second modified, example, the period A1 may be a period for which, a parameter (for example, the pressure or the time) correlated to the temperature of a working fluid that has passed, through the evaporator 104 satisfies a certain condition equivalent to the condition that the temperature of a working fluid is equal to or smaller than a threshold. By setting such a period as the period A1, it is possible to shift the operation from the first control to the second control at an appropriate timing.

In a manner similar to the setting of the period A1 in the first and second modes of the second modified example, the end of the period A2 of the shutdown operation may also be set. More specifically, when a measured value or an estimated value of the pressure of a working fluid that has passed through the evaporator 104 has reached a threshold, or when a time elapsed after the controller 128 has started to prevent the expander 105 from expanding a working fluid has reached a threshold, the period A2 may be terminated. The period A2 is an example of the fourth period in which the first control is executed. By preventing the expander 105 from expanding a working fluid, until the temperature of a working fluid that has passed, through the evaporator 104 becomes equal to or smaller than a threshold, it is possible to reduce the possibility that a liquid working fluid be sucked into the expander 105. In this case, as the threshold, the temperature of a working fluid that contains a liquid component when it has passed, through the evaporator 104 is set. If this technique is employed, in the period A2 of the shutdown operation, when a measured, value or an estimated value of the temperature or the pressure of a working fluid that has passed through the evaporator 104 has reached a threshold, power supply to the converter 120 is terminated, thereby canceling the state in which the expander 105 is prevented from expanding a working fluid. The operation of the pump 107 is stopped before power supply to the converter 120 is terminated.

(Third Modified Example)

The approach to allowing the expander 105 to expand a working fluid in the second, control is not restricted to the setting of a voltage across terminals of the generator 108 to be zero. In a third modified example, in the second control, the controller 128 causes the converter 120 to set a current to flow through the generator 108 to be zero, thereby allowing the expander 105 to expand a working fluid. In the third modified, example, braking torque of the generator 108 is very small (substantially zero), since a current does not flow through the generator 108 while the second control is being executed in the startup operation. Accordingly, in the second control, the rotational speed, of the generator 108 increases to the switching rotational speed, in a short period of time.

In the third modified example, the voltage command generator 132 is operated by using equations (9-B) and (10-B) instead of equations (4-B) and (5-B), respectively.

$$v_\gamma^* = \left(K_{pi} + \frac{K_{ii}}{s}\right)(0 - i_\gamma) \tag{9-B}$$

$$v_\delta^* = \left(K_{pi} + \frac{K_{ii}}{s}\right)(0 - i_\delta) \tag{10-B}$$

(First Mode Of Fourth Modified Example)

The approach to calculating the γ-axis target current $i_\gamma^*$ and the δ-axis target current $i_\delta^*$ by the current command generator 131 in at least one of the third control in the startup operation and the fourth control in the shutdown operation is not restricted to the use of the target rotational speed ω*. In a first mode of a fourth modified example, in at least one of the third control in the startup operation and the fourth control in the shutdown operation, the current command generator 131 calculates the γ-axis target, current $i_\gamma^*$ and the δ-axis target, current, $i_\delta^*$ by using target power output from the generator 108. That is, in the first mode of the fourth modified example, in at least one of the third control in the startup operation and the fourth control in the shutdown operation, the controller 128 causes the converter 120 to control the generator 108 so as to adjust power generated by the generator 108. The controller 128 informs the converter 120 of target power, and the converter 120 controls the generator 108 such that estimated power to be generated by the generator 108 coincides with the target power.

(Second Mode Of Fourth Modified Example)

In a second mode of the fourth modified example, in at least one of the third control in the startup operation and the fourth control in the shutdown operation, the current command generator 131 calculates the γ-axis target current $i_\gamma^*$ and the δ-axis target current $i_\delta^*$ by using a target braking force of the generator 108. That is, in the second mode of the fourth modified, example, in at least one of the third control in the startup operation and the fourth control in the shutdown operation, the controller 128 causes the converter 120 to control the generator 108 so as to adjust a braking force generated by the generator 108. The controller 128 informs the converter 120 of a target braking force, and the converter 120 controls the generator 108 such that an estimated braking force to be generated by the generator 108 coincides with the target braking force. The braking force is estimated by the converter control unit 130.

(Second Embodiment)

Figure 10:
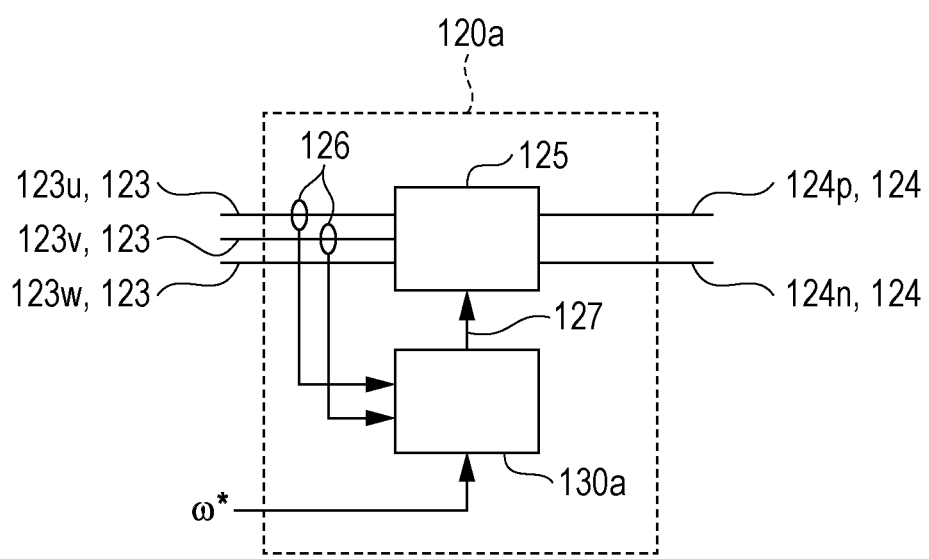
FIG. 10 is a block diagram of a converter in the second embodiment.
Figure 11:
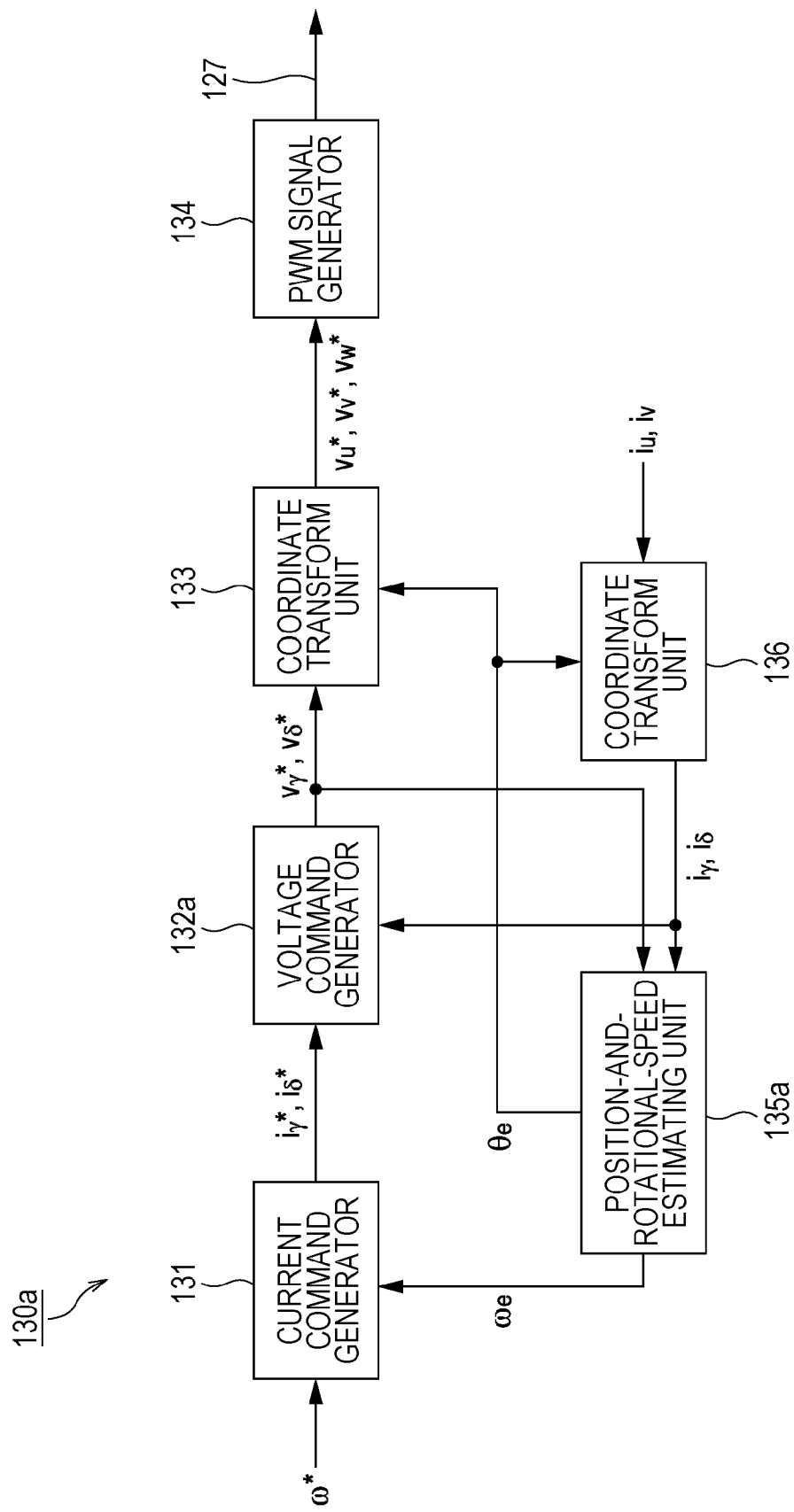
FIG. 11 is a block diagram of a converter control unit in the second embodiment.

A power generation apparatus 100a of a second embodiment will be described below with reference to FIGS. 9 through 11. In the second embodiment, components similar to those of the first embodiment, are designated by like reference numerals, and an explanation thereof will thus be omitted.

Figure 9:
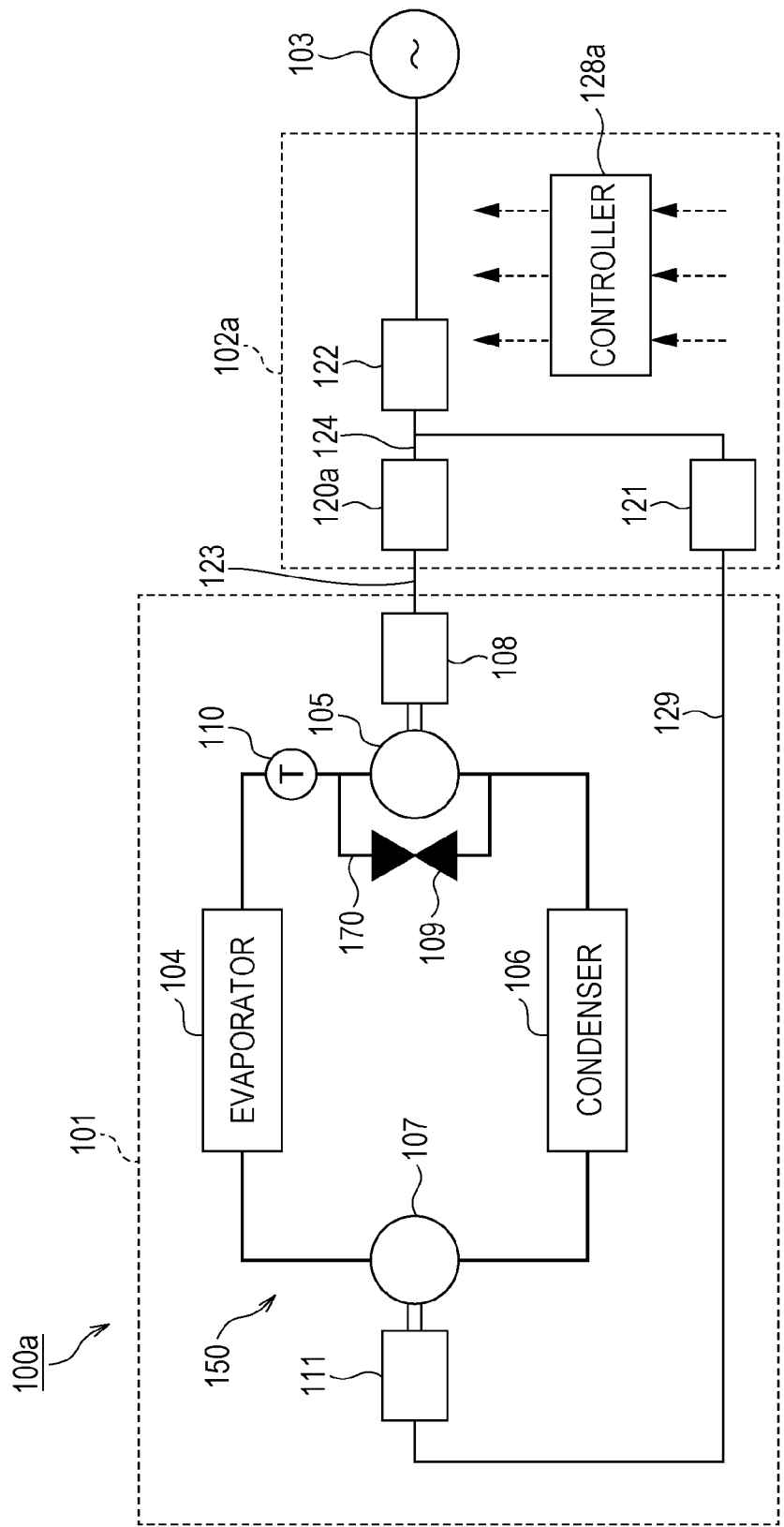
FIG. 9 is a block diagram of a power generation apparatus according to a second embodiment.

The power generation apparatus 100a of the second embodiment includes, as shown in FIG. 9, a power generation control system 102a. The power generation control system 102a includes, as shown in FIG. 9, a converter 120a and a controller 128a. The converter 120a includes, as shown in FIG. 10, a converter control unit 130a. The converter control unit 130a includes, as shown in FIG. 11, a voltage command generator 132a and a position-and-rotational-speed estimating unit 135a.

In at least one of the startup operation and the shutdown operation of the Rankine cycle system 101, the controller 128a performs the following first control. The controller 128a causes the converter 120a to control the generator 108 such that the expander 105 is prevented from expanding a working fluid when, a working fluid at the outlet, of the evaporator 104 contains a liquid component while the pump 107 is operating. The controller 128a may be of any type as long as it has a control function. The controller 128a includes a processor (not shown) and a storage unit (not shown) storing a control program therein. As the processor, an MPU or a CPU may be used. As the storage unit, a memory may be used. The controller 128a may be constituted by a single control unit that, performs centralized, control or by a plurality of control units that perform, distributed control in cooperation with each other.

Part of or the entirety of the control function of the converter control unit 130a of this embodiment, which will be discussed later, may be integrated into the controller 128a.

On the basis of the γ-axis current $i_\gamma$, the δ-axis current $i_\delta$, the γ-axis target voltage $v_\gamma^*$, and the δ-axis target voltage $v_\delta^*$, the position-and-rotational-speed estimating unit 135a calculates the estimated, rotational speed $\omega_e$ and the estimated position $\theta_e$ and outputs them.

On the basis of the γ-axis current $i_\gamma$, the δ-axis current $i_\delta$, the γ-axis target current $i_\gamma^*$, and the δ-axis target current $i_\delta^*$, the voltage command generator 132a calculates a γ-axis target voltage $v_\gamma^*$ and a δ-axis target voltage $v_\delta^*$ and outputs them.

A control sequence of the startup operation of the second embodiment, will be discussed below with reference to FIG. 12.

In the control sequence shown in FIG. 12, there are no steps corresponding to steps S160 and S170 of FIG. 5. Accordingly, if it is determined in step S150 of FIG. 12 that the temperature of a working fluid exceeds a threshold, the process proceeds to step S180. Except for this point, the control sequence of FIG. 12 is the same as that of FIG. 5.

A period A1 in FIG. 12 is a period for which the expander 105 is prevented from expanding a working fluid. The period A1 is an example of the first period in which the first control is executed. The period A1 corresponds to steps S120 through S150 of FIG. 12. A period C1 in FIG. 12 is a period for which the rotational speed of the generator 108 (expander 105) is adjusted under the control of the controller 128a using the converter 120a. The period C1 is an example of a third period in which the third control is executed. The period C1 corresponds to steps S180 through S200 of FIG. 12. In this embodiment, a period B1 is not set in which the rotational speed of the generator 108 increases from, zero due to the difference between the pressure of a working fluid, at the inlet of the expander 105 and that, at the outlet of the expander 105. The period B1 is an example of a second, period in which the second, control is executed.

(Operation of Converter Control Unit 130a in Period A1 and Period C1)

Subsequent to the first control, the controller 128a causes the converter 120a to start the third control in which the controller 128a controls the generator 108 so as to adjust the rotational speed of the generator 108. In the period A1, the converter control unit 130a causes the converter circuit 125 to cause a current containing a high-frequency component to flow through the generator 108, thereby estimating the position of the rotor of the generator 108. In a transition from the first control to the third control, the converter control unit 130a starts to adjust the rotational speed of the generator 108 by using the estimated position of the rotor. In this embodiment, in the period A1, the controller 128a causes the converter 120a to cause a current which is generated by superposing a high-frequency component on a DC component to flow through the generator 108. Then, the converter 120a restricts an operation of the rotor of the generator 108 and also estimates the position of the rotor of the generator 108.

The above-described control may be applied to the first modified example. In this case, the converter 120a causes an AC current containing a high-frequency component which reversely rotates the generator 108 to flow through the generator 108, thereby allowing the expander 105 to compress a working fluid and also estimating the position of the rotor of the generator 108.

A technique for estimating the position and the velocity of a rotor by using a current containing a high-frequency component is known, and thus, a detailed, description of such a technique will be omitted (see, for example, Japanese Patent No. 4425193 which discloses a technique for estimating the position and the rotational speed of a rotor by applying a voltage containing a high-frequency component to a motor and by referring to a high-frequency component of a current flowing through the motor).

In this specification, "high frequency" refers to a wave of a frequency sufficiently higher than the frequency of a drive voltage of the generator 108. The generator 108 is not operated, by the above-described, high-frequency component.

The converter control unit 130a is operated by using equations (20-A), (20-C), (21-A), (21-C), (22), (23), (24), (6), and (7).

$$v_\delta^* =$$

$$\begin{cases} \left(K_{pi} + \dfrac{K_{ii}}{s}\right)(0 - i_\gamma) + v_{h\gamma} & (20-A) \\ \left(K_{pi} + \dfrac{K_{ii}}{s}\right)(i_\gamma^* - i_\gamma) + v_{h\gamma} & (20-C) \end{cases}$$

$$v_\delta^* =$$

$$\begin{cases} \left(K_{pi} + \dfrac{K_{ii}}{s}\right)(i_{\delta 0}^* - i_\delta) + v_{h\delta} & (21-A) \\ \left(K_{pi} + \dfrac{K_{ii}}{s}\right)(i_\delta^* - i_\delta) + v_{h\delta} & (21-C) \end{cases}$$

$$\Delta\theta = K \cdot ihD \tag{22}$$

$$\omega_e = \left(K_{\text{pll\_p}} + \dfrac{K_{\text{pll\_i}}}{s}\right)\Delta\theta \tag{23}$$

$$\theta_e = \dfrac{\omega_e}{s} \tag{24}$$

Equations (20-A), (20-C), (21-A), and (21-C) are used by the voltage command generator 132a for calculating the γ-axis target voltage $v_\gamma^*$ and the δ-axis target voltage $v_\delta^*$. Equations (20-A) and (21-A) are used in the period A1. Equations (20-C) and (21-C) are used in the period C1. In equations, $v_{h\gamma}$ and $v_{h\delta}$ are a γ-axis component and a δ-axis component, respectively, in a high-frequency component contained in a target voltage. By performing an operation on the basis of equations (20-A), (20-C), (21-A), and (21-C), the voltage command generator 132a calculates a target voltage containing a high-frequency component and outputs it. The γ-axis target current $i_\gamma^*$ and the δ-axis target current $i_\delta^*$ in equations (20-C) and (21-C) are calculated by the current command generator 131 using equations (6) and (7), as in the first embodiment.

Equations (22), (23), and (24) are used by the position-and-rotational-speed estimating unit 135a for calculating the axis error $\Delta\theta$, the estimated rotational speed $\omega_e$, and the estimated position $\theta_e$. Equations (22), (23), and (24) are used, both in the first control and the third control. In equation (22), ihD is a value obtained as follows. First, a $\gamma$-axis component $i_{h\gamma}$ and a $\delta$-axis component $i_{h\delta}$ in a high-frequency component of a current flowing through the generator 108 are extracted. Then, the product of $i_{h\gamma} \times i_{h\delta}$ is calculated. Then, a DC component of the obtained product is extracted. The $\gamma$-axis component $i^{h\gamma}$ and the $\delta$-axis component $i_{h\delta}$ in a high-frequency component of a current flowing through the generator 108 may be extracted by allowing the $\gamma$-axis current $i_\gamma$ and the $\delta$-axis current $i_\delta$, respectively, output from the coordinate transform unit 136 to pass through a band-pass filter. The product of $i_{h\gamma} \times i_{h\delta}$ may be calculated by multiplying the $\gamma$-axis component $i_{h\gamma}$ by the $\delta$-axis component $i_{h\delta}$ by using a multiplier. A DC component of the product $i_{h\gamma} \times i_{h\delta}$ (that is, ihD) may be extracted by allowing the product $i_{h\gamma} \times i_{h\delta}$ to pass through a low-pass filter. Details of a method for specifying ihD is disclosed in Japanese Patent. No. 4425193, and thus, an explanation thereof will be omitted.

In the first control, the voltage command generator 132a is operated, by using equations (20-A) and (21-A). As a result of this operation, the control signal 127 that causes a current generated by superposing a high-frequency component on a DC component to flow through the generator 108 is output from the converter control unit 130a. This DC component restricts the operation of the rotor of the generator 108, thereby preventing the expander 105 from expanding a working fluid. From the high-frequency component, ihD is specified, as described above. In the first control, the position-and-rotational-speed estimating unit 135a is operated by using equations (22), (23), and (24). As a result of this operation, the axis error $\Delta\theta$, the estimated rotational speed $\omega_e$, and the estimated position $\theta_e$ are calculated. In the period A1, the $\gamma$-axis target current $i_\gamma^*$ and the $\delta$-axis target current $i_\delta^*$ calculated by the current command generator 131 are not used.

In the third control, the current command generator 131 is operated, by using equations (6) and (7). As a result of this operation, the $\gamma$-axis target current $i_\gamma^*$ and the $\delta$-axis target current $i_\delta^*$ are calculated such that the estimated rotational speed $\omega_e$ coincides with, the target rotational speed $\omega^*$. In the third control, the voltage command generator 132a is operated, by using equations (20-C) and (21-C). As a result of this operation, components that follow the $\gamma$-axis target current $i_\delta^*$ and the $\delta$-axis target current $i_\delta^*$ and a high-frequency component appear in the $\gamma$-axis current $i_\gamma$ and the $\delta$-axis current $i_\delta$. The components that, follow the $\gamma$-axis target current $i_\gamma^*$ and the $\delta$-axis target current $i_\delta^*$ contribute to the control of the rotational speed of the generator 108. In the third control of this embodiment, the rotational speed of the generator 108 increases from zero. From the high-frequency component, ihD is specified as described above. In the third control, the position-and-rotational-speed estimating unit 135a is operated by using equations (22), (23), and (24). As a result of this operation, the axis error $\Delta\theta$, the estimated rotational speed $\omega_e$, and the estimated position $\theta_e$ are calculated. In the normal operation, control similar to the third control is performed.

Even in the first control in which the expander 105 and the generator 108 are still, the converter control unit 130a is able to estimate the position and the rotational speed of the rotor of the generator 108. This means that it is possible to start the third control in which the rotational speed of the generator 108 is adjusted, immediately after the state in which the expander 105 is prevented from expanding a working fluid is canceled (the state in which the operation of the rotor is restricted is canceled). That is, the period B1 of the first embodiment is not necessary, thereby making it possible to decrease the time taken to perform the startup operation.

However, the second control may be interposed between the first control and the third control. Additionally, the first control of the second embodiment may be combined with the third control of the first embodiment. With this configuration, in the third control, a current flowing through the generator 108 while the rotational speed of the generator 108 is being adjusted, does not contain a high-frequency component. This is preferable in terms of avoiding or reducing loss caused by a high-frequency component.

The technique for estimating the position and the rotational speed, of the rotor of the generator 108 by using a current containing a high-frequency component is also applicable to the shutdown operation. It is possible to directly shift the operation from the fourth control in which, the rotational speed of the generator 108 is adjusted to the first control in which the operation of the rotor of the generator 108 is restricted. That is, the fifth control may be omitted. According to the technique for utilizing a current containing a high-frequency component, even if the rotational speed of the generator 108 is low, the position and the rotational speed of the rotor may be estimated with high precision. Accordingly, even if the rotational speed is decreased before the operation is directly shifted from the fourth control to the first control, the control precision is not decreased in the fourth control. In the shutdown operation of the first embodiment, as well as in the second embodiment, the fifth control may be omitted.

The techniques discussed in the first embodiment are applicable to the power generation apparatus 100a of the second embodiment as long as there is no inconsistency in such an application. Conversely, the techniques discussed, in the second embodiment, are applicable to the power generation, apparatus 100 of the first embodiment as long as there is no inconsistency in such an application.

What is claimed is:

1. A power generation control system that controls operations of a Rankine cycle system including an expander, a generator interconnected to the expander, a pump feeding a working fluid, and an evaporator evaporating the working fluid, the power generation control system comprising:
   a converter; and
   a controller including a processor and a non-transitory computer readable medium storing executable instructions thereon, wherein the executable instructions, when executed by the processor, cause the controller to:
   cause the converter to execute first control in at least one of a startup operation and a shutdown operation of the Rankine cycle system, the first control including the converter causing an electric current from a power source to flow through the generator such that the expander is prevented from expanding the working fluid if the working fluid at an outlet of the evaporator contains a liquid component while the pump is operating.

2. The power generation control system according to claim 1, wherein the executable instructions, when executed by the processor, cause the controller to cause the converter to restrict an operation of a rotor of the generator by causing the electric current, in the form of direct current, to flow through the generator, thereby preventing the expander from expanding the working fluid.

3. The power generation control system according to claim 2, wherein:
in the startup operation of the Rankine cycle system, the executable instructions, when executed by the processor, cause the controller to cause the converter to execute, subsequent to the first control, third control in which the executable instructions, when executed by the processor, cause the controller to control the generator such that a rotational speed of the generator is adjusted; and
the converter (i) restricts the operation of the rotor and also estimates a position of the rotor by causing the electric current, in the form of a current generated by superposing a high-frequency component on a direct current component to flow through the generator while the first control is being executed, and (ii) starts to adjust the rotational speed of the generator by using an estimated position of the rotor in a transition from the first control to the third control.

4. The power generation control system according to claim 1, wherein:
the expander also serves as a compressor; and
the executable instructions, when executed by the processor, cause the controller to cause the converter to control the generator such that the expander compresses the working fluid, thereby preventing the expander from expanding a working fluid.

5. The power generation control system according to claim 4, wherein:
in the startup operation of the Rankine cycle system, the executable instructions, when executed by the processor, cause the controller to cause the converter to execute, subsequent to the first control, third control in which the executable instructions, when executed by the processor, cause the controller to control the generator such that a rotational speed of the generator is adjusted; and
the converter (i) estimates a position of a rotor of the generator by causing the electric current, in the form of a current containing a high-frequency component, to flow through the generator while the first control is being executed, and (ii) starts to adjust the rotational speed of the generator by using an estimated position of the rotor in a transition from the first control to the third control.

6. The power generation control system according to claim 1, wherein, in the startup operation of the Rankine cycle system, subsequent to the first control, the executable instructions, when executed by the processor, cause the controller to cause the converter to execute second control to allow the expander to expand the working fluid by setting a voltage across terminals of the generator to be zero or by setting the electric current flowing through the generator to be zero.

7. power generation control system according to claim 6, wherein, in the startup operation of the Rankine cycle system, subsequent to the second control, the executable instructions, when executed by the processor, cause the controller to cause the converter to execute third control in which the controller controls the generator such that a rotational speed of the generator is adjusted.

8. The power generation control system according to claim 1, wherein the executable instructions, when executed by the processor, cause the controller to execute the first control when a temperature of the working fluid that has passed through the evaporator is equal to or smaller than a threshold.

9. The power generation control system according to claim 1, wherein:
the Rankine cycle system includes a bypass channel which bypasses the expander and an opening-and-closing device which opens and closes the bypass channel; and
in at least one of the startup operation and the shutdown operation of the Rankine cycle system, the executable instructions, when executed by the processor, cause the controller to control the opening-and-closing device to be opened while the first control is being executed.

10. The power generation control system according to claim 9, wherein:
in the startup operation of the Rankine cycle system, subsequent to the first control, the executable instructions, when executed by the processor, cause the controller to cause the converter to execute second control to allow the expander to expand the working fluid by setting a voltage across terminals of the generator to be zero or by setting the electric current flowing through the generator to be zero; and
the executable instructions, when executed by the processor, cause the controller to control the opening-and-closing device such that an opening degree of the opening-and-closing device at an end point of the second control is smaller than an opening degree of the opening-and-closing device at a start point of the second control.

11. The power generation control system according to claim 10, wherein:
in the startup operation of the Rankine cycle system, subsequent to the second control, the executable instructions, when executed by the processor, cause the controller to cause the converter to execute third control in which the controller controls the generator such that a rotational speed of the generator is adjusted; and
the executable instructions, when executed by the processor, cause the controller to control the opening-and-closing device such that an opening degree of the opening-and-closing device at an end point of the startup operation is smaller than an opening degree of the opening-and-closing device at a start point of the third control.

12. The power generation control system according to claim 9, wherein:
in the startup operation of the Rankine cycle system, subsequent to the first control, the executable instructions, when executed by the processor, cause the controller to cause the converter to execute third control in which the controller controls the generator such that a rotational speed of the generator is adjusted; and
the controller controls the opening-and-closing device such that an opening degree of the opening-and-closing device at an end point of the startup operation is smaller than an opening degree of the opening-and-closing device at a start point of the third control.

13. The power generation control system according to claim 1, wherein, in the shutdown operation of the Rankine cycle system, the executable instructions, when executed by the processor, cause the controller to terminate the first control after the pump stops operating.

14. The power generation control system according to claim 1, further comprising:
a grid-interconnection power converter to be connected to the power source,
wherein the power source is an electrical grid, and power is supplied to the converter from the electrical grid via the grid-interconnection power converter so as to prevent the expander from expanding the working fluid.

15. A power generation apparatus comprising:
the generation control system according to claim 1; and
the Rankine cycle system controlled by the power generation control system.

16. A control method for a Rankine cycle system including an expander, a generator interconnected to the expander, a pump feeding a working fluid, and an evaporator evaporating the working fluid, the control method comprising:
controlling power to be generated by the generator; and
controlling, in at least one of a startup operation and a shutdown operation of the Rankine cycle system, the generator, the controlling of the generator in at least one of the startup operation and the shutdown operation of the Rankine cycle system including causing an electric current from a power source to flow through the generator such that the expander is prevented from expanding the working fluid if the working fluid at an outlet of the evaporator contains a liquid component while the pump is operating.

* * * * *